United States Patent
Mashino et al.

(10) Patent No.: US 8,369,789 B2
(45) Date of Patent: Feb. 5, 2013

(54) WIRELESS COMMUNICATION SYSTEM, INTERFERENCE CANCELLING STATION, AND INTERFERENCE CANCELLING METHOD

(75) Inventors: Jun Mashino, Yokosuka (JP); Takatoshi Sugiyama, Yokosuka (JP); Kentaro Nishimori, Yokosuka (JP); Kengo Nagata, Yokosuka (JP); Yusuke Asai, Yokosuka (JP)

(73) Assignee: Nippon Telegraph and Telphone Corporation, Tokyo (JP)

( * ) Notice: Subject to any disclaimer, the term of this patent is extended or adjusted under 35 U.S.C. 154(b) by 193 days.

(21) Appl. No.: 12/812,102

(22) PCT Filed: Feb. 5, 2009

(86) PCT No.: PCT/JP2009/000451
§ 371 (c)(1),
(2), (4) Date: Jul. 8, 2010

(87) PCT Pub. No.: WO2009/101776
PCT Pub. Date: Aug. 20, 2009

(65) Prior Publication Data
US 2010/0291877 A1  Nov. 18, 2010

(30) Foreign Application Priority Data
Feb. 13, 2008 (JP) .................................. 2008-032076

(51) Int. Cl.
*H04B 1/00* (2006.01)
*H04B 15/00* (2006.01)

(52) U.S. Cl. ..................... 455/63.1; 370/310; 375/346

(58) Field of Classification Search .............. 455/63.1, 455/67.13, 517, 524; 370/310; 375/346
See application file for complete search history.

(56) References Cited

U.S. PATENT DOCUMENTS

| 7,787,572 | B2 * | 8/2010 | Scharf et al. ................. 375/346 |
| 7,929,473 | B2 * | 4/2011 | Willenegger et al. ......... 370/310 |

FOREIGN PATENT DOCUMENTS

| JP | 2003-209879 A | 7/2003 |
| WO | 95/26593 A2 | 10/1995 |
| WO | 98/57452 A1 | 12/1998 |
| WO | 01/06664 A2 | 1/2001 |

(Continued)

OTHER PUBLICATIONS

Winters, J. H., "Smart antennas for wireless systems", IEEE Personal Communications, vol. 5, No. 1, Feb. 1998, pp. 23-27.

(Continued)

*Primary Examiner* — Andrew Wendell
*Assistant Examiner* — Chung-Tien Yang
(74) *Attorney, Agent, or Firm* — Harness, Dickey & Pierce, P.L.C.

(57) ABSTRACT

An interference cancelling station ICS includes a transmission weight factor calculating unit calculating a transmission weight factor w2 and an interference cancelling data signal transmitting unit generating an interference cancelling data signal by multiplying, by the transmission weight factor w2, a data signal transmitted by a base station BSb of the wireless communication system B and transmitting the interference cancelling data signal in synchronization with timing with which the base station BSb of a wireless communication system B transmits the data signal, and a mobile station MSa of a wireless communication system A receives a data signal transmitted by a base station BSa of the wireless communication system A, the data signal having cancelled interference from the base station BSb of the wireless communication system B.

18 Claims, 12 Drawing Sheets

FOREIGN PATENT DOCUMENTS

| WO | WO2007/107409 | * | 9/2007 | 398/79 |
| WO | WO2007/113265 | * | 10/2007 | 455/517 |

OTHER PUBLICATIONS

Wong, K., Murch, R. D., Letaief, K. B., "Performance enhancement of multiuser MIMO wireless communication systems", IEEE Transaction on Communications, vol. 50, No. 12, Dec. 2002, pp. 1960-1970.

Hui, J., "Throughput Analysis for Code Division Multiple Accessing of the Spread Spectrum Channel", IEEE Journal on selected areas in Communications, vol. SAC-2, No. 4, Jul. 1984, pp. 482-486.

* cited by examiner

Fig. 1
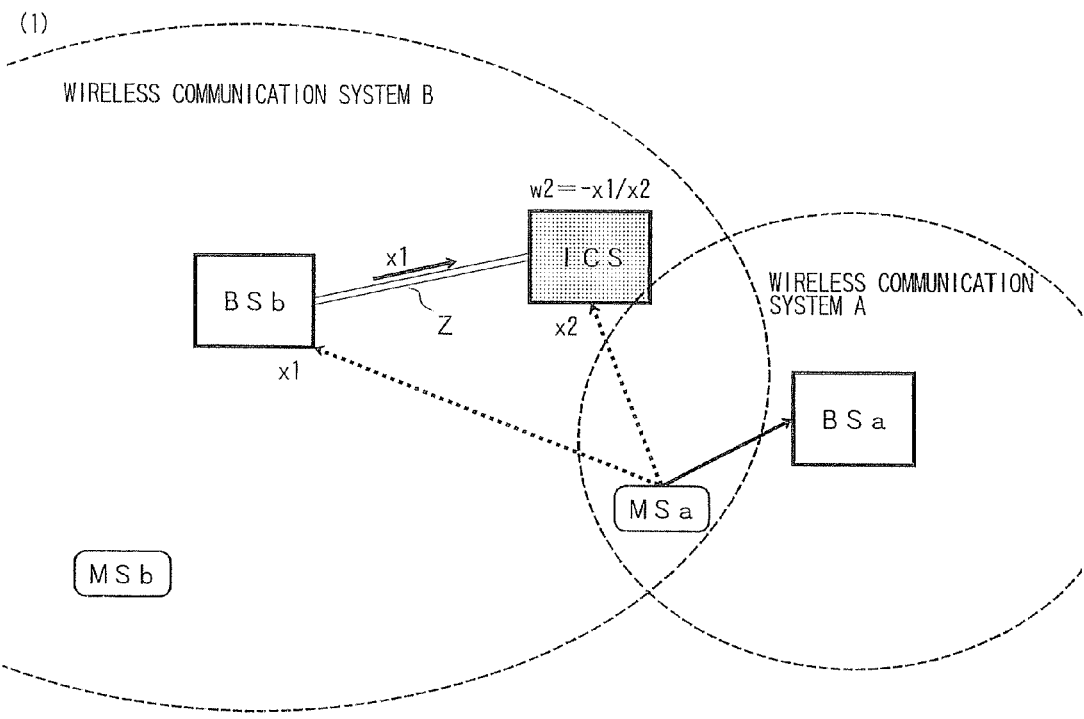
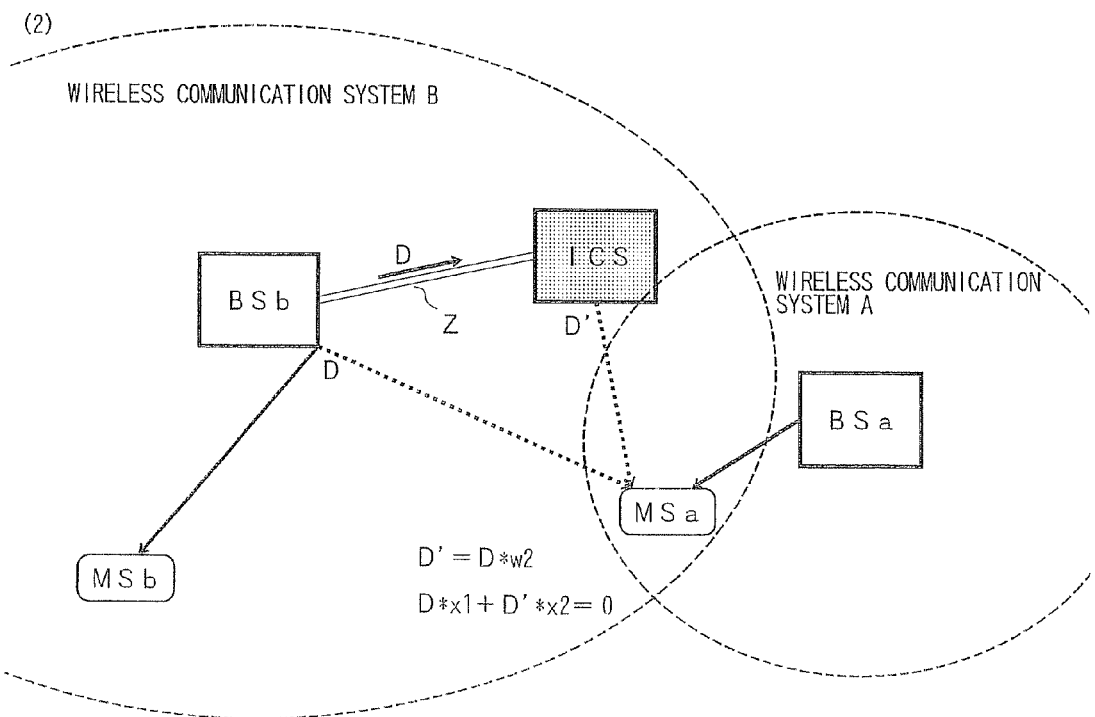

Fig. 3
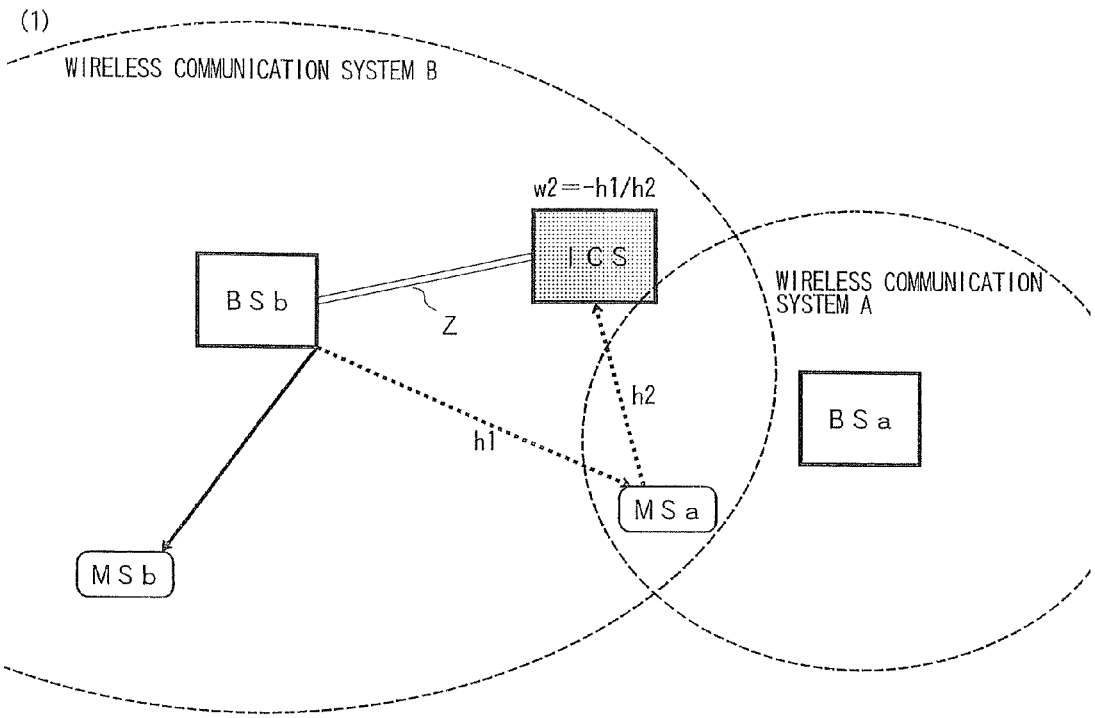
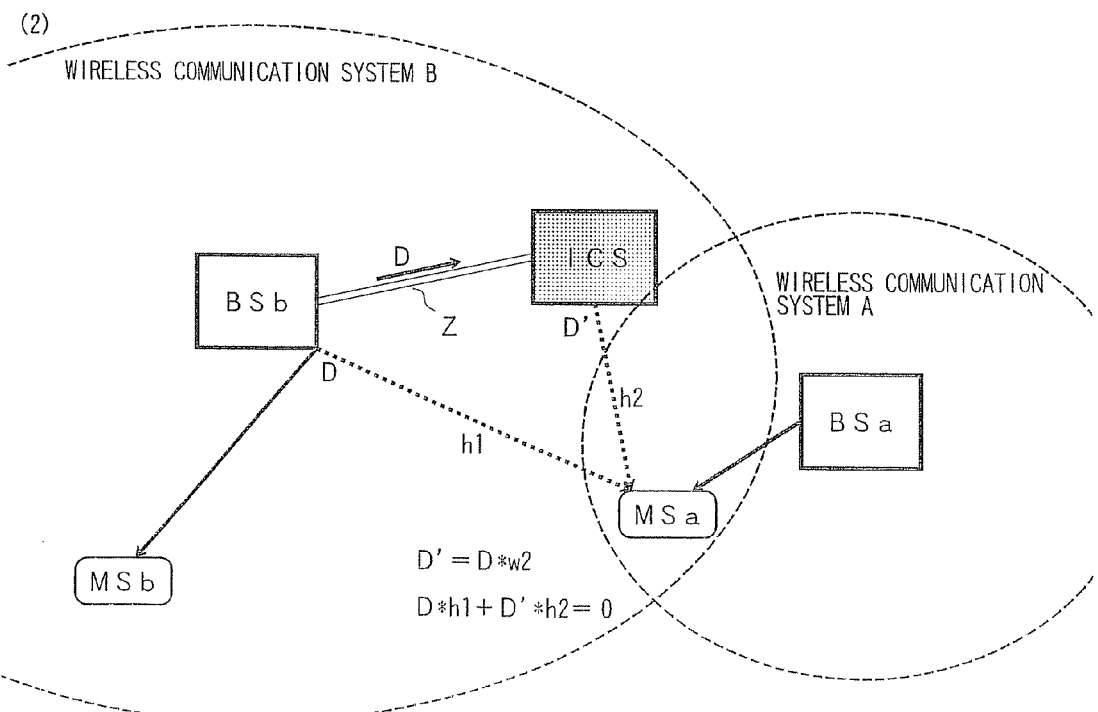

Fig. 6
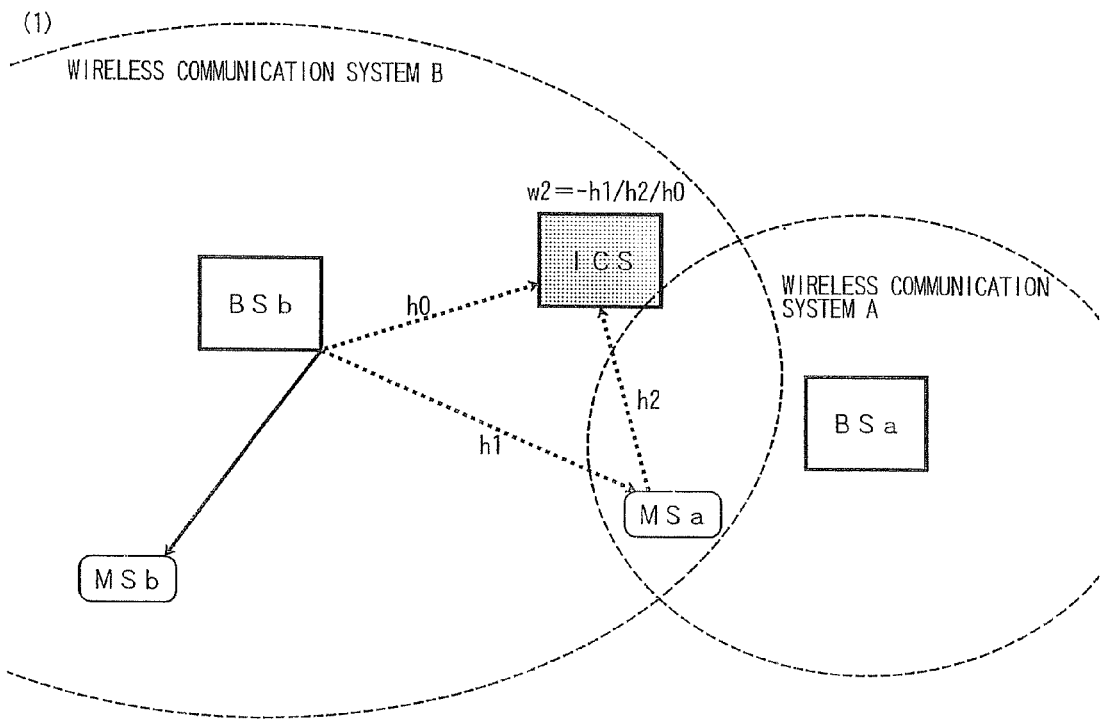
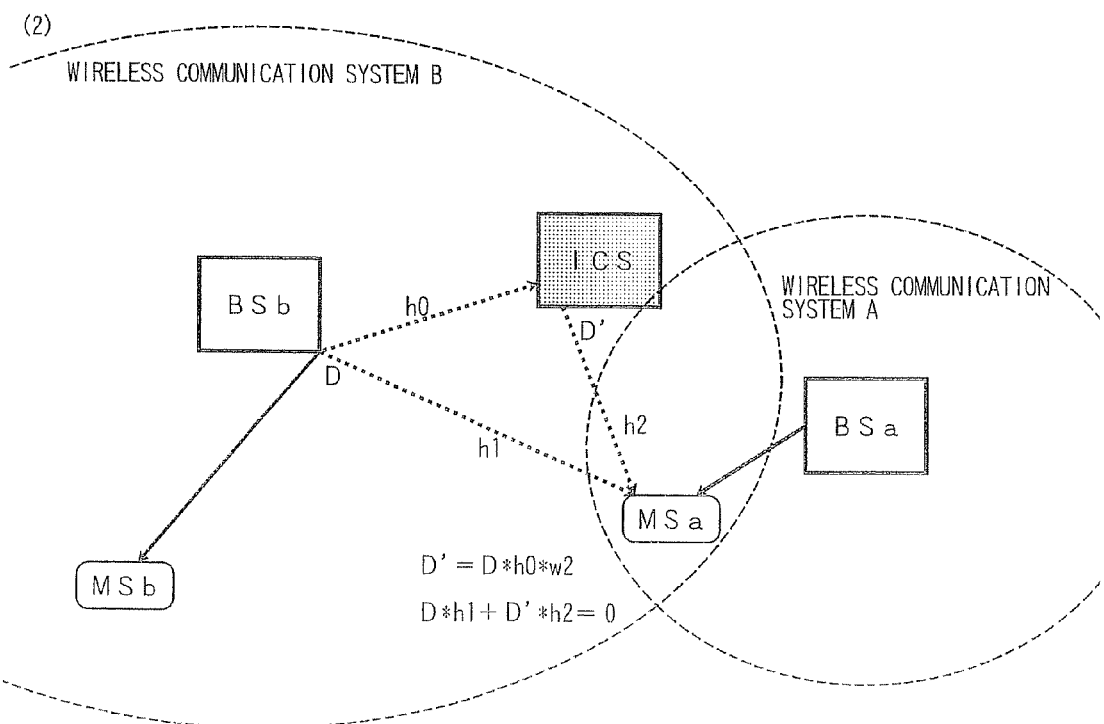

Fig. 8
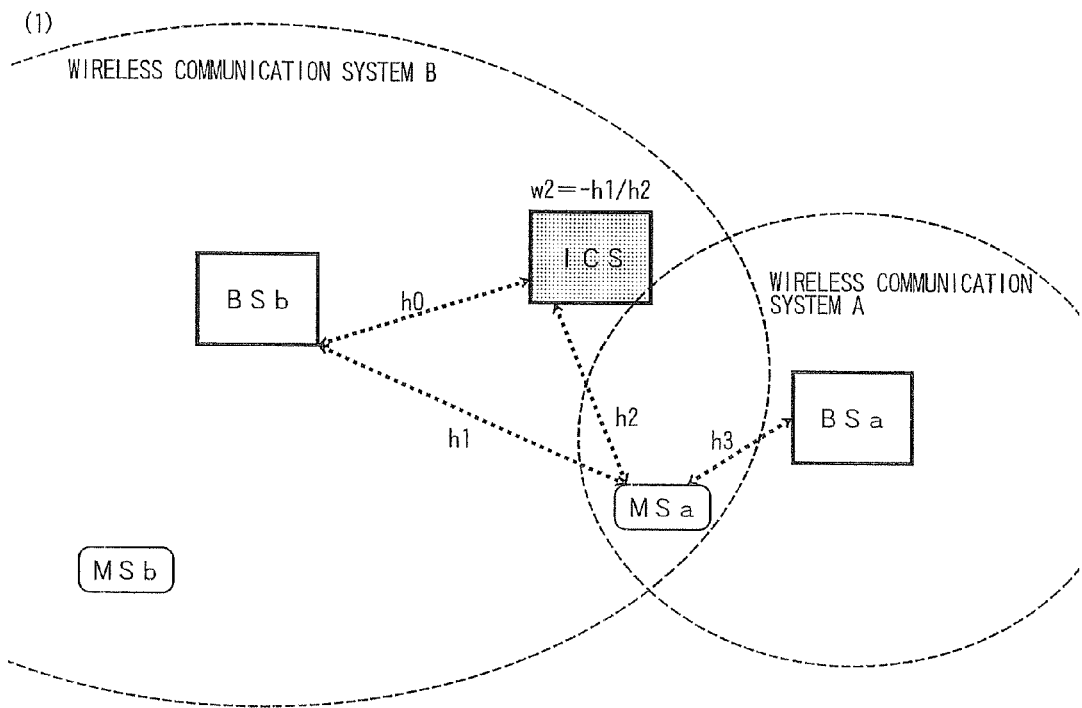
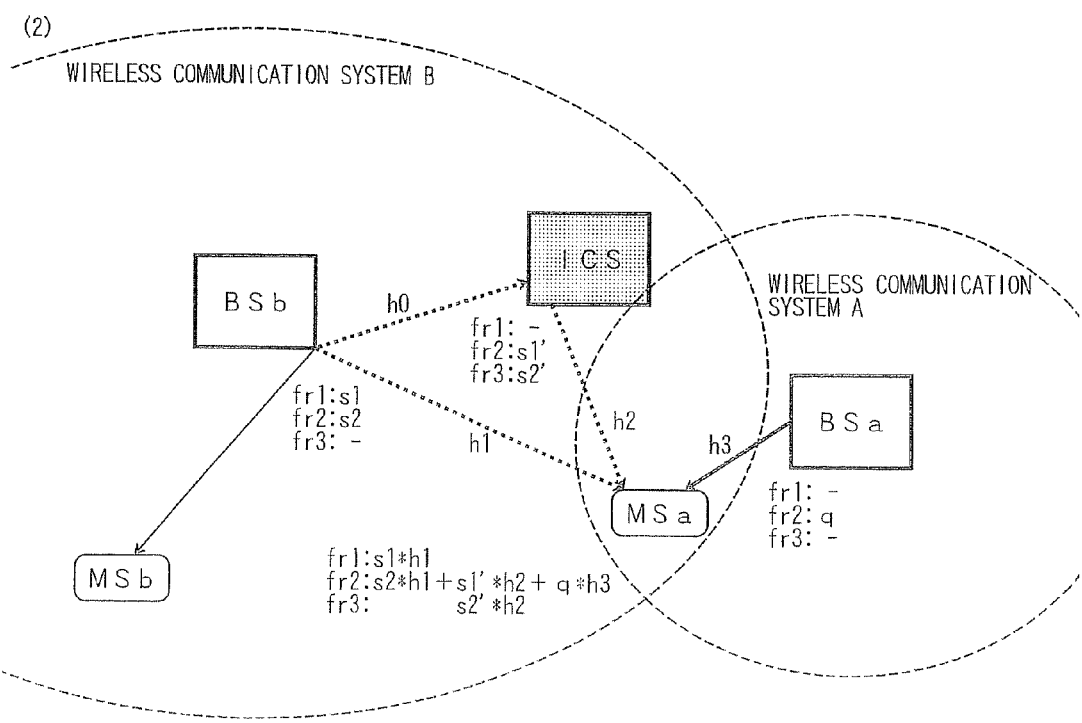

WIRELESS COMMUNICATION SYSTEM, INTERFERENCE CANCELLING STATION, AND INTERFERENCE CANCELLING METHOD

CROSS-REFERENCE TO RELATED APPLICATION

This application is a U.S. National Stage application claiming the benefit of prior filed International Application Number PCT/JP2009/000451, filed on Feb. 5, 2009, in which the International Application claims priority from Japanese Patent Application Number 2008-032076, filed on Feb. 13, 2008, the entire contents of which are incorporated herein by reference.

TECHNICAL FIELD

The present invention relates to a wireless communication system, an interference cancelling station, and an interference cancelling method that cancel out, in a mobile station of one wireless communication system, an interference signal from a base station of the other wireless communication system when a plurality of wireless communication systems having mutually adjacent or overlapping wireless areas use the same frequency channel.

BACKGROUND ART

When a plurality of cells using the same frequency channel are situated in proximity to each other, due to the interference of each other's radio waves, the communication quality of a wireless communication system is markedly degraded. It is for this reason that the frequency reuse distance is usually calculated with consideration given to the power attenuation due to a propagation path loss, and base stations using the same frequency channel are disposed so as to be geographically away from each other.

With the recent spread of various wireless communications and conversion to broadband wireless communication, the communication capacity of the wireless communication system is expected to increase. To meet that requirement, there is a method of increasing the number of base stations. However, the frequency band suitable for wireless communication, typified by the microwave band, has already become scarce, and it is not easy to increase the number of base stations due to the above-described interference associated with the same frequency channel.

As a technique to hold a plurality of users in the same frequency channel, there are spatial multiplexing techniques such as space division multiple access (SDMA) and multiuser multi input multi output (MIMO) (Documents 1 and 2). In SDMA, user multiplexing for the same frequency channel is realized by performing space separation of the wireless resource on a user-by-user basis based on direction of arrival estimation technology or the like. In multiuser MIMO, the signals spatially multiplexed on the same frequency channel are demultiplexed by multiuser detection by using different propagation paths formed between a plurality of transmitting and receiving antennas.

As a technique different from the spatial multiplexing technique, code division multiple access (CDMA) is known (Document 3). In CDMA, the signals of a plurality of users or a plurality of cells can be separated by using spread sequences with a low correlation value, it can be said to be a wireless communication system that tolerates interference associated with the same frequency channel. Therefore, when a new base station is added, the addition can be realized by relatively flexible base station allocation planning from the point of view of interference.

Document 1: Winters, J. H., "Smart antennas for wireless systems", IEEE Personal Communications, Vol. 5, No. 1, pp. 23-27, February 1998

Document 2: Kai-Kit Wong, Murch, R. D., Letaief, K. B., "Performance enhancement of multiuser MIMO wireless communication systems", IEEE Transaction on Communications, Vol. 50, No. 12, pp. 1960-1970, December 2002

Document 3: Hui, J., "Throughput Analysis for Code Division Multiple Accessing of the Spread Spectrum Channel", IEEE Journal on selected areas in Communications, Vol. SAC-2, No. 4, pp. 482-486, July 1984

DISCLOSURE

Problems to be Solved

The techniques of SDMA and multiuser MIMO work effectively in the same wireless communication system. However, between different wireless communication systems using the same frequency channel and situated in proximity to each other, in mobile stations of wireless communication systems which do not support SDMA or multiuser MIMO, it is difficult to perform communication due to the interference described above. Moreover, in SDMA, separation cannot be performed when another wireless station exists on a line between a wireless station performing SDMA control and a wireless station with which communication is performed.

In the technique of CDMA, since the wireless resource is divided in advance by using a sequence, the actual frequency use efficiency per unit base station is reduced with an increase in the number of base stations. Therefore, it is difficult to achieve conversion to broadband wireless communication under circumstances where the frequency band becomes scarce as described earlier. In addition, as in the spatial multiplexing technique, between different wireless communication systems using the same frequency channel and situated in proximity to each other, in mobile stations of wireless communication systems which do not use the same CDMA method or which do not use the CDMA method, it is difficult to perform communication due to the interference described earlier.

A proposition of the present invention is to provide an interference cancelling method, an interference cancelling station, and a wireless communication system that can cancel out, in a mobile station of one wireless communication system, an interference signal from a base station of the other wireless communication system when a plurality of wireless communication systems having mutually adjacent or overlapping wireless areas use the same frequency channel.

Means for Solving the Problems

According to the first aspect of the present invention, a wireless communication system includes a wireless communication system A and a wireless communication system B which use a same frequency channel in mutually adjacent or overlapping wireless areas and an interference cancelling station ICS installed in a location different from locations of base stations and mobile stations of the wireless communication systems A and B, wherein the interference cancelling station ICS includes a transmission weight factor calculating unit calculating a transmission weight factor w2 of the interference cancelling station ICS by using a first information corresponding to a propagation path between a mobile station MSa of the wireless communication system A and a base station BSb of the wireless communication system B and a second information corresponding to a propagation path between the mobile station MSa of the wireless communication system A and the interference cancelling station ICS, and an interference cancelling data signal transmitting unit generating an interference cancelling data signal by multiplying, by the transmission weight factor w2, a data signal which the base station BSb of the wireless communication system B transmits to a subordinate mobile station, and transmitting the interference cancelling data signal in synchronization with timing with which the base station BSb of the wireless communication system B transmits the data signal, in which the mobile station MSa of the wireless communication system A receives a data signal transmitted by a base station BSa of the wireless communication system A, the data signal having cancelled interference from the base station BSb of the wireless communication system B.

According to the second aspect of the present invention, in the wireless communication system of the first aspect, when the first information is a radio signal x1 transmitted by the mobile station MSa of the wireless communication system A and received by the base station BSb of the wireless communication system B, the second information is a radio signal x2 transmitted by the mobile station MSa of the wireless communication system A and received by the interference cancelling station ICS, and a transmission weight factor of the base station BSb of the wireless communication system B is w1, the base station BSb of the wireless communication system B includes a unit transmitting, before transmitting a data signal to the subordinate mobile station, the radio signal x1 and the data signal to the interference cancelling station ICS via a dedicated communication line, and the transmission weight factor calculating unit of the interference cancelling station ICS calculates the transmission weight factor w2 (=−w1*x1/x2) from a relational expression $$w1*x1+w2*x2=0$$

for the radio signals x1 and x2 and the transmission weight factors w1 and w2.

According to the third aspect of the present invention, in the wireless communication system of the first aspect, when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS, and a transmission weight factor of the base station BSb of the wireless communication system B is w1, the base station BSb of the wireless communication system B includes a unit transmitting, before transmitting a data signal to the subordinate mobile station, the data signal to the interference cancelling station ICS via a dedicated communication line, and the transmission weight factor calculating unit of the interference cancelling station ICS calculates the transmission weight factor w2 (=−w1*h1/h2) from a relational expression $$w1*h1+w2*h2=0$$

for the channel factors h1 and h2 and the transmission weight factors w1 and w2.

According to the fourth aspect of the present invention, in the wireless communication system of the first aspect, when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit of the interference cancelling station ICS calculates the transmission weight factor w2 (=−h1/h2/h0) from a relational expression $$w1*h1+w2*w1*h0*h2=0$$

for the channel factors h0, h1, and h2 and the transmission weight factors w1 and w2, and the interference cancelling data signal transmitting unit of the interference cancelling station ICS receives, on an RF device, a data signal which the base station BSb of the wireless communication system B transmits to the subordinate mobile station, and, at a same time, multiplies the data signal by the transmission weight factor w2 and transmits a resultant signal as the interference cancelling data signal.

According to the fifth aspect of the present invention, in the wireless communication system of the first aspect, when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit of the interference cancelling station ICS calculates the transmission weight factor w2 (=−w1*h1/h2) from a relational expression $$w1*h1+w2*h2=0$$

for the channel factors h1 and h2 and the transmission weight factors w1 and w2, the base station BSb of the wireless communication system B sequentially transmits data signals to the subordinate mobile station from a frame 1 to a frame (N−L), L being an integer which is 1 or more but (N−1) or less, within a time period of N frames, N being an integer which is 2 or more, and stops data transmission from a frame (N−L+1) to a frame N, the base station BSa of the wireless communication system A transmits a data signal in one frame within the time period of the N frames, when the interference cancelling data signal transmitting unit of the interference cancelling station ICS receives the data signals in the frame 1 to the frame (N−L), the data signals being transmitted by the base station BSb of the wireless communication system B, the interference cancelling data signal transmitting unit divides the data signals by the channel factor h0 and further multiplies the data signals by the transmission weight factor w2 so as to generates interference cancelling data signals, and sequentially transmits the interference cancelling data signals with timing of a frame (L+1) to the frame N, and the mobile station MSa of the wireless communication system A adds the data signals received from the base station BSb of the wireless communication system B within the time period of the N frames, the interference cancelling data signals received from the interference cancelling station ICS, and the data signal received from the base station BSa of the wireless communication system A on a frame-by-frame basis, cancels out interference from the base station BSb of the wireless communication system B, and extracts the data signal received from the base station BSa.

According to the sixth aspect of the present invention, in the wireless communication system of the first aspect, when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit of the interference cancelling station ICS calculates the transmission weight factor w2 (=−h1/h2/h0) from a relational expression $$w1*h1+w2*w1*h0*h2=0$$

for the channel factors h0, h1, and h2 and the transmission weight factors w1 and w2, the base station BSb of the wireless communication system B sequentially transmits data signals to the subordinate mobile station from a frame 1 to a frame (N−L), L being an integer which is 1 or more but (N−1) or less, within a time period of N frames, N being an integer which is 2 or more, and stops data transmission from a frame (N−L+1) to a frame N, the base station BSa of the wireless communication system A transmits a data signal in one frame within the time period of the N frames, when the interference cancelling data signal transmitting unit of the interference cancelling station ICS receives the data signals in frame 1 to the frame (N−L), the data signals being transmitted by the base station BSb of the wireless communication system B, the interference cancelling data signal transmitting unit generates the interference cancelling data signals by multiplying the data signals by the transmission weight factor w2 and sequentially transmits the interference cancelling data signals with timing of ar frame (L+1) to the frame N, and the mobile station MSa of the wireless communication system A adds the data signals received from the base station BSb of the wireless communication system B within the time period of the N frames, the interference cancelling data signals received from the interference cancelling station ICS, and the data signal received from the base station BSa of the wireless communication system A on a frame-by-frame basis, cancels out interference from the base station BSb of the wireless communication system B, and extracts the data signal received from the base station BSa.

According to the seventh aspect of the present invention, in the wireless communication system of the fifth aspect or the sixth aspect, the base station BSa of the wireless communication system A transmits the same data signal in a plurality of frames within the time period of the N frames, and the mobile station MSa of the wireless communication system A performs in-phase combining on received signals within the time period of the N frames and extracts the data signal received from the base station BSa.

According to the eighth aspect of the present invention, in the wireless communication system of any one of the third to sixth aspects, the mobile station MSa of the wireless communication system A receives a data signal which the base station BSb of the wireless communication system B transmits to the subordinate mobile station, estimates the channel factor h1 by using a known preamble signal Q of the wireless communication system B, and transmits to the interference cancelling station ICS a signal obtained by multiplying a known preamble signal P of the wireless communication system A by the channel factor h1 being estimated after the know preamble signal P, and the interference cancelling station ICS receives a transmitted signal of the mobile station MSa of the wireless communication system A, estimates the channel factor h2 by using the known preamble signal P, and restores the channel factor h1 by using the channel factor h2 being estimated and the known preamble signal P.

According to the ninth aspect of the present invention, in the wireless communication system of any one of the fourth to sixth aspects, the interference cancelling station ICS receives a data signal which the base station BSb of the wireless communication system B transmits to the subordinate mobile station, and estimates the channel factor h0 by using a known preamble signal Q of the wireless communication system B.

According to the tenth aspect of the present invention, in the wireless communication system of any one of the second, third, and fifth aspects, the transmission weight factor calculating unit calculates the transmission weight factor w2 by setting w1 at 1.

According to the eleventh aspect of the present invention, an interference cancelling station of a wireless communication system having a wireless communication system A and a wireless communication system B which use a same frequency channel in mutually adjacent or overlapping wireless areas and an interference cancelling station ICS installed in a location different from locations of base stations and mobile stations of the wireless communication systems A and B, the interference cancelling station includes a transmission weight factor calculating unit calculating a transmission weight factor w2 of the interference cancelling station ICS by using a first information corresponding to a propagation path between a mobile station MSa of the wireless communication system A and a base station BSb of the wireless communication system B and a second information corresponding to a propagation path between the mobile station MSa of the wireless communication system A and the interference cancelling station ICS, and an interference cancelling data signal transmitting unit generating an interference cancelling data signal by multiplying, by the transmission weight factor w2, a data signal which the base station BSb of the wireless communication system B transmits to a subordinate mobile station, and transmitting the interference cancelling data signal in synchronization with timing with which the base station BSb of the wireless communication system B transmits the data signal, wherein the interference cancelling station makes the mobile station MSa of the wireless communication system A cancel out interference from the base station BSb of the wireless communication system B and receive a data signal transmitted by a base station BSa of the wireless communication system A.

According to the twelfth aspect of the present invention, in the interference cancelling station of the eleventh aspect, when the first information is a radio signal x1 transmitted by the mobile station MSa of the wireless communication system A and received by the base station BSb of the wireless communication system B, the second information is a radio signal x2 transmitted by the mobile station MSa of the wireless communication system A and received by the interference cancelling station ICS, and a transmission weight factor of the base station BSb of the wireless communication system B is w1, the transmission weight factor calculating unit calculates the transmission weight factor w2 (=−w1*x1/x2) from a relational expression $$w1*x1+w2*x2=0$$

for the radio signals x1 and x2 and the transmission weight factors w1 and w2.

According to the thirteenth aspect of the present invention, in the interference cancelling station of the eleventh aspect, when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS, and a transmission weight factor of the base station BSb of the wireless communication system B is w1, the transmission weight factor calculating unit calculates the transmission weight factor w2 (=−w1*h1/h2) from a relational expression $$w1*h1+w2*h2=0$$

for the channel factors h1 and h2 and the transmission weight factors w1 and w2.

According to the fourteenth aspect of the present invention, in the interference cancelling station of the eleventh aspect, when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit calculates the transmission weight factor w2 (=−h1/h2/h0) from a relational expression $$w1*h1+w2*w1*h0*h2=0$$

for the channel factors h0, h1, and h2 and the transmission weight factors w1 and w2, and the interference cancelling data signal transmitting unit receives, on an RF device, a data signal which the base station BSb of the wireless communication system B transmits to the subordinate mobile station, and, at a same time, multiplies the data signal by the transmission weight factor w2 and transmits a resultant signal as the interference cancelling data signal.

According to the fifteenth aspect of the present invention, in the interference cancelling station of the eleventh aspect, when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit calculates the transmission weight factor w2 (=−w1*h1/h2) from a relational expression $$w1*h1+w2*h2=0$$

for the channel factors h1 and h2 and the transmission weight factors w1 and w2, and, when the base station BSb of the wireless communication system B sequentially transmits data signals to the subordinate mobile station from a frame 1 to a frame (N−L), L being an integer which is 1 or more but (N−1) or less, within a time period of N frames, N being an integer which is 2 or more, and stops data transmission from a frame (N−L+1) to a frame N, upon receipt of the data signals in the frame 1 to the frame (N−L), the data signals being transmitted by the base station BSb of the wireless communication system B, the interference cancelling data signal transmitting unit divides the data signals by the channel factor h0 and further multiplies the data signals by the transmission weight factor w2 so as to generate interference cancelling data signals, and sequentially transmits the interference cancelling data signals with timing of a frame (L+1) to the frame N.

According to the sixteenth aspect of the present invention, in the interference cancelling station of the eleventh aspect, when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit calculates the transmission weight factor w2 (=−h1/h2/h0) from a relational expression $$w1*h1+w2*w1*h0*h2=0$$

for the channel factors h0, h1, and h2 and the transmission weight factors w1 and w2, and, when the base station BSb of the wireless communication system B sequentially transmits data signals to the subordinate mobile station from a frame 1 to a frame (N−L), L being an integer which is 1 or more but (N−1) or less, within a time period of N frames, N being an integer which is 2 or more, and stops data transmission from a frame (N−L+1) to a frame N, upon receipt of the data signals in the frame 1 to the frame (N−L), the data signals being transmitted by the base station BSb of the wireless communication system B, the interference cancelling data signal transmitting unit generates interference cancelling data signals by multiplying the data signals by the transmission weight factor w2, and sequentially transmits the interference cancelling data signals with timing of a frame (L+1) to the frame N.

According to the seventeenth aspect of the present invention, in the interference cancelling station of any one of the twelfth, thirteenth, and fifteenth aspects, the transmission weight factor calculating unit calculates the transmission weight factor w2 by setting w1 at 1.

According to the eighteenth aspect of the present invention, an interference cancelling method of a wireless communication system includes a wireless communication system A and a wireless communication system B which use a same frequency channel in mutually adjacent or overlapping wireless areas and an interference cancelling station ICS installed in a location different from locations of base stations and mobile stations of the wireless communication systems A and B, wherein the interference cancelling station ICS calculates a transmission weight factor w2 of the interference cancelling station ICS by using a first information corresponding to a propagation path between a mobile station MSa of the wireless communication system A and a base station BSb of the wireless communication system B and a second information corresponding to a propagation path between the mobile station MSa of the wireless communication system A and the interference cancelling station ICS, and generates an interference cancelling data signal by multiplying, by the transmission weight factor w2, a data signal which the base station BSb of the wireless communication system B transmits to a subordinate mobile station, and transmits the interference cancelling data signal in synchronization with timing with which the base station BSb of the wireless communication system B transmits the data signal, in which the mobile station MSa of the wireless communication system A cancels out interference from the base station BSb of the wireless communication system B, and receives a data signal transmitted by a base station BSa of the wireless communication system A.

According to the present invention, by positioning an interference cancelling station between wireless communication systems A and B using a same frequency channel, transmitting an interference cancelling data signal from the interference cancelling station in synchronization with a data signal transmitted from a base station BSb of the wireless communication system B, and cancelling out the data signal and the interference cancelling data signal in a mobile station MSa of the wireless communication system A, it is possible to realize communication without interference between a base station BSa and the mobile station MSa of the wireless communication system A. This makes it possible to use the same frequency channel in a plurality of wireless communication systems at one time and enhance the frequency use efficiency.

BRIEF DESCRIPTION OF THE DRAWINGS

FIG. 1 is a diagram showing an example of a configuration of Embodiment 1 of a wireless communication system of the present invention.

FIG. 3 is a diagram showing an example of a configuration of Embodiment 2 of the wireless communication system of the present invention.

FIG. 6 is a diagram showing an example of a configuration of Embodiment 3 of the wireless communication system of the present invention.

FIG. 8 is a diagram showing an example of a configuration of Embodiment 4 of the wireless communication system of the present invention.

DETAILED DESCRIPTION OF THE EMBODIMENTS

Embodiment 1

Figure 2:
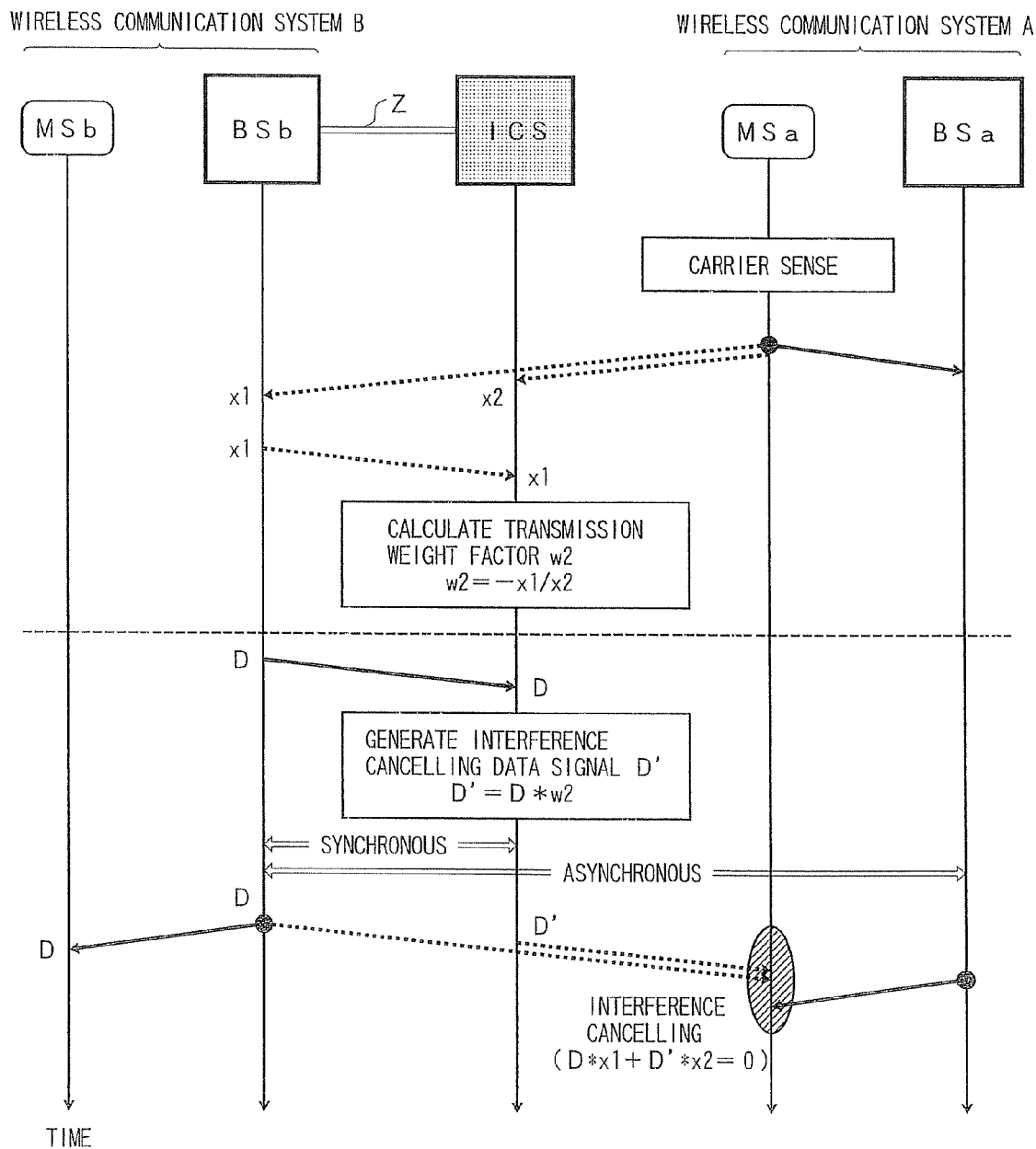
FIG. 2 is a diagram showing a process sequence of Embodiment 1.

FIG. 1 shows an example of a configuration of Embodiment 1 of a wireless communication system of the present invention. FIG. 2 shows a process sequence of Embodiment 1.

In FIG. 1, this embodiment is a configuration in which a base station BSa and a mobile station MSa which form a wireless communication system A, a base station BSb and a mobile station MSb which form a wireless communication system B, and, aside from these wireless stations, an interference cancelling station ICS are positioned. It is assumed that the wireless communication system A and the wireless communication system B use the same frequency channel in transmission and reception in a time division duplexing (TDD) method but operate asynchronously. However, the wireless communication system A and the wireless communication system B may be the same wireless communication system and operate synchronously in an adjacent cell relationship. The same goes for the following embodiments.

Here, the ICS and the BSb have a communicating unit Z which is different from the wireless communication systems A and B to perform mutual data communication. The communicating unit Z may be either a wireless unit or a wired unit, but is assumed to have the same transmission capacity as the wireless communication system B. Moreover, the MSa has a carrier sense function, and can detect the presence or absence of radio waves in the same frequency channel of the wireless communication systems A and B. However, the carrier sense is not necessarily needed in access control, etc. of the wireless communication system A. In addition, the ICS and the BSb have wireless interfaces to receive the radio waves of the MSa, but there is no need to demodulate them into signals of the wireless communication system A.

Hereinafter, the procedure of each wireless station in Embodiment 1 will be described with reference to FIGS. 1 and 2. FIG. 1(1) corresponds to a procedure performed until a transmission weight factor w2 is calculated in the ICS in following steps (1) to (4), and FIG. 1(2) corresponds to a procedure performed until a transmitted signal of the BSb is cancelled out at a reception point of the MSa in the following steps (5) to (7).

(1) The MSa performs carrier sense in the same frequency channel of the wireless communication systems A and B, and transmits an arbitrary signal at a time during which the frequency channel is found not to be used. This signal may be a data signal for the BSa. However, the carrier sense is not necessarily needed in access control, etc. of the wireless communication system A. In that case, the carrier sense is performed exclusively on the wireless communication system B.

(2) The transmitted signal of the MSa is received by the BSa, the ICS, and the BSb via wireless paths. If this signal is not for the BSa, the BSa ignores the signal. The BSb and the ICS buffer the signal from the MSa. The times of receipt in the BSb and the ICS do not necessarily coincide exactly with each other. Here, the received signal of the BSb is assumed to be x1, and the received signal of the ICS is assumed to be x2. The respective received signals x1 and x2 are signals obtained by multiplying the transmitted signal of the MSa by a channel factor between the MSa and the BSb and a channel factor between the MSa and the ICS.

(3) The BSb transfers the received signal x1 to the ICS via the communicating unit Z.

(4) The ICS solves the relational expressions:

$$w1*x1+w2*x2=0 \quad (1)$$

$$w1=1 \quad (2)$$

for the received signal x1 of the BSb obtained in (3), the received signal x2 of the ICS obtained in (2), and the transmission weight factors w1 and w2 of the BSb and the ICS, and thereby obtains the transmission weight factor w2 (=−x1/x2) of the ICS. The transmission weight factors w1 and w2 are parameters set so that a transmitted signal D*w1 of the BSb and a transmitted signal D*w2 of the ICS are in reversed phase at a reception point of the MSa and cancel each other out. Here, w1 is set at 1 so that the process is dealt with by control of the ICS alone; however, w1 may take on any value.

In that case, the ICS acquires the transmission weight factor w1 from the BSb separately, and calculates the transmission weight factor w2 based on a calculation formula: w2=−w1*x1/x2. Alternatively, the transmission weight factor w1 of the ICS and the BSb may be set at a known fixed value.

(5) When a data signal which the BSb transmits to the MSb in the next transmission is assumed to be D, the BSb transfers the data signal D to the ICS via the communicating unit Z before actually transmitting the data signal D, and thereby shares the data signal D which the BSb transmits next and the transmission timing thereof with the ICS. The ICS generates an interference cancelling data signal D' (=D*w2) by multiplying the data signal D by the transmission weight factor w2 obtained in (4).

(6) The BSb transmits the data signal D to the MSb, and the ICS transmits the interference cancelling data signal D' in synchronization with timing with which the BSb transmits the data signal D to the MSb.

(7) Thereafter, during repetition of steps (1) to (6) or steps (5) and (6), the MSa and the BSa of the wireless communication system A perform communication and the MSb and the BSb of the wireless communication system B perform communication, but the wireless communication systems A and B are not required to be synchronized with each other. In terms of a received signal of the MSa during this period, the transmitted data signal D of the BSb, the signal which is an interference signal for the MSa, and the interference cancelling data signal D' transmitted from the ICS are in reversed phase at a reception point of the MSa and cancel each other out. That is, even when the wireless communication system A and the wireless communication system B use the same frequency channel, since the interference signal from the BSb of the wireless communication system B is cancelled out at the point of the MSa of the wireless communication system A, the MSa can perform communication with the BSa without being affected by the interference signal of the wireless communication system B. Although sometimes the interference cancelling data signal D' transmitted from the ICS also reaches the MSb of the wireless communication system B, the signal does not become a cancelling signal for the transmitted data signal D of the BSb in relation to the transmission weight factor w2.

A feature of Embodiment 1 is that calculation of the transmission weight factor and signal processing for interference cancelling are performed only by the ICS, and the BS and the MS do not have to perform special signal processing for interference cancelling.

Embodiment 2

Figure 4:
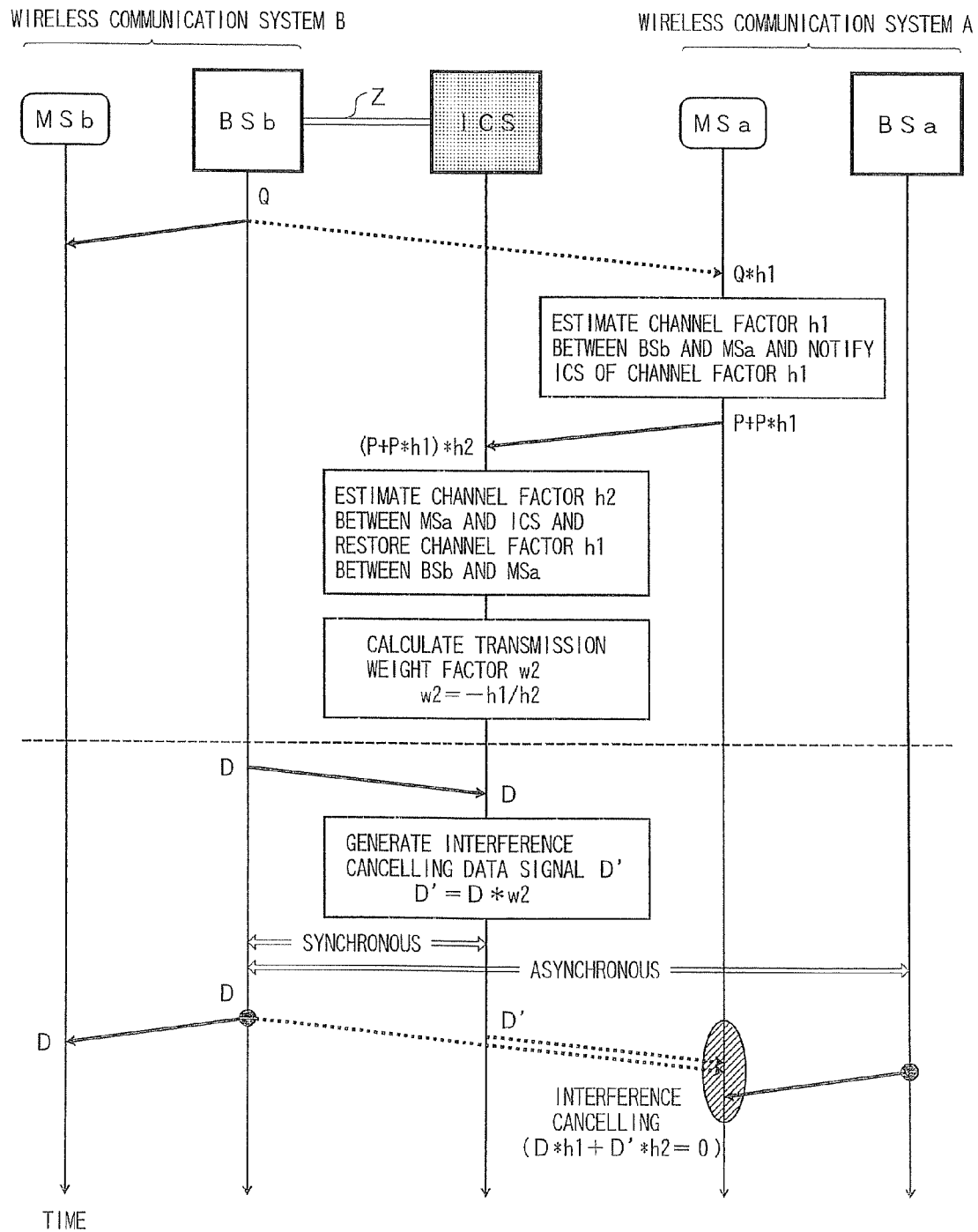
FIG. 4 is a diagram showing a process sequence of Embodiment 2.
Figure 5:
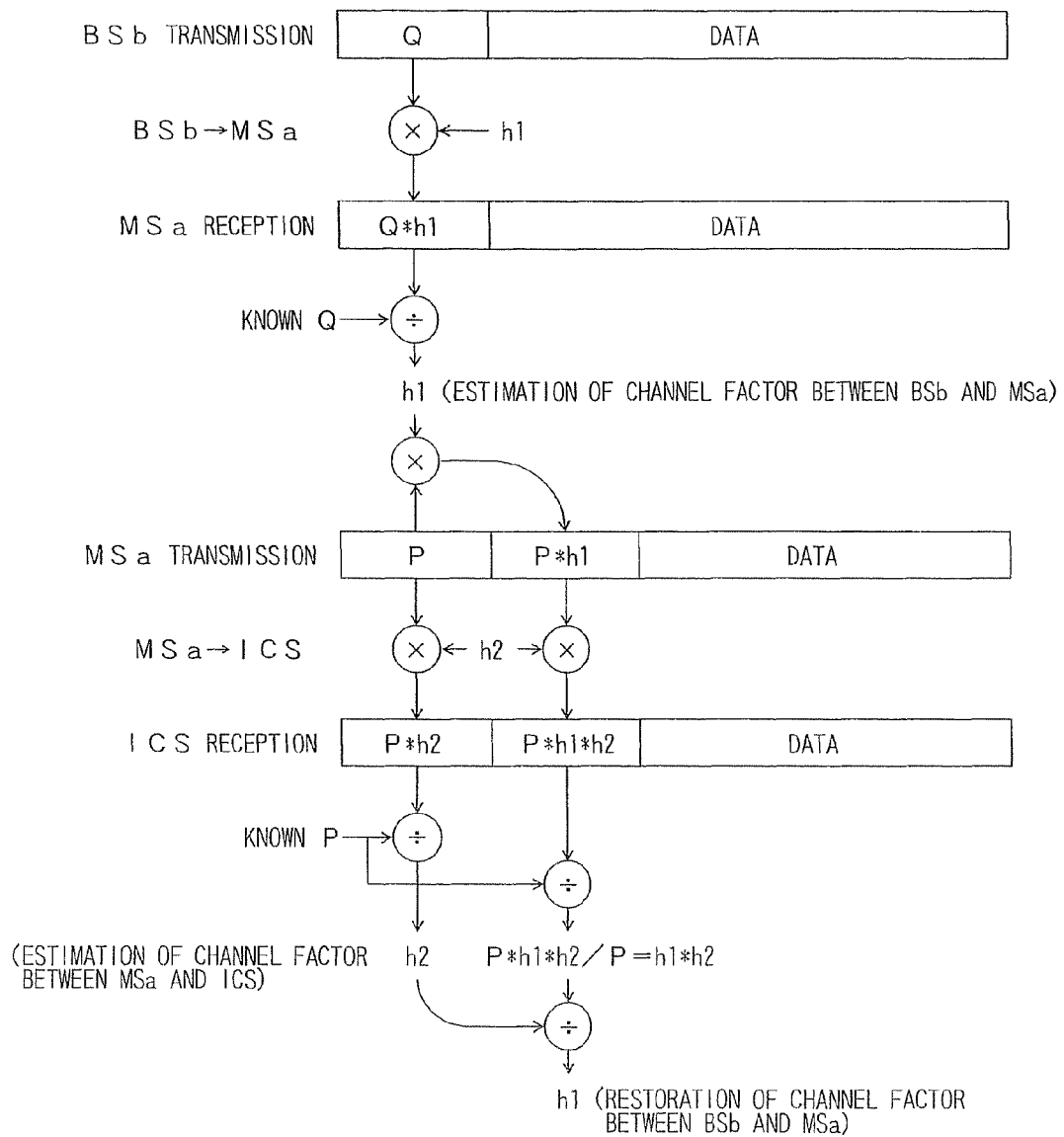
FIG. 5 is a diagram explaining an estimation/restoration process of channel factors h1 and h2.

FIG. 3 shows an example of a configuration of Embodiment 2 of the wireless communication system of the present invention. FIG. 4 shows a process sequence of Embodiment 2. FIG. 5 is a diagram explaining an estimation/restoration process of channel factors h1 and h2.

The wireless communication system of Embodiment 2 shown in FIG. 3 has the same configuration as that of Embodiment 1 shown in FIG. 1; however, this embodiment differs therefrom in that a channel factor h1 between the BSb and the MSa and a channel factor h2 between the ICS and the MSa are detected. It is assumed that the wireless communication system A and the wireless communication system B use the same frequency channel in transmission and reception in a time division duplexing (TDD) method, and the channel factors h1 and h2 have bidirectional reciprocity in communication.

Here, the ICS has a wireless interface for receiving and demodulating the radio waves of the MSa of the wireless communication system A. It is assumed that the MSa can demodulate at least a known preamble signal added to a head, etc. of a frame of the signal of the wireless communication system B.

Hereinafter, a procedure of each wireless station in Embodiment 2 will be described with reference to FIGS. 3 to 5. FIG. 3(1) corresponds to a procedure performed until a transmission weight factor w2 is calculated in the ICS in following steps (1) to (4), and FIG. 3(2) corresponds to a procedure performed until a transmitted signal of the BSb is cancelled out at a reception point of the MSa in the following steps (5) to (7).

(1) When the MSa receives the data signal which the BSb transmitted to the MSb, the channel factor h1 between the BSb and the MSa is estimated as follows by using a preamble signal Q at the head of a frame. The MSa treats the preamble signal Q in the wireless communication system B as a known signal and demodulates the received signal into the preamble signal Q. At this time, since the preamble signal Q obtained by demodulation is received as Q*h1 obtained by multiplying the preamble signal Q by the channel factor h1 between the BSb and the MSa, the channel factor h1 is estimated by dividing Q*h1 by the known preamble signal Q as shown in FIG. 5. However, it is assumed that, for simplicity's sake, noise in the receiver can be ignored.

(2) As shown in FIG. 5, as a data signal to be transmitted to the ICS, the MSa places a signal P*h1 obtained by multiplying a known preamble signal P by the channel factor h1 estimated in (1) after the known preamble signal P at the head of a frame, and transmits the data signal to the ICS.

(3) The ICS receives the data signal transmitted by the MSa, and, as shown in FIG. 5, first estimates the channel factor h2 between the MSa and the ICS by dividing a preamble signal P*h2 at the head of a frame by the known preamble signal P (P*h2/P=h2) and then restores the channel factor h1 between the BSb and the MSa by dividing the signal P*h1*h2 by the preamble signal P and the h2 obtained by the estimation (P*h1*h2/P/h2=h1).

(4) The ICS solves the relational expressions:

$$w1*h1+w2*h2=0 \quad (3)$$

$$w1=1 \quad (4)$$

for the channel factors h1 and h2 obtained in step (3) and the transmission weight factors w1 and w2 of the BSb and the ICS, and thereby obtains the transmission weight factor w2 (=−h1/h2) of the ICS. As in Embodiment 1, the transmission weight factors w1 and w2 are parameters set so that a transmitted signal D*w1 of the BSb and a transmitted signal D*w2 of the ICS are in reversed phase at a reception point of the MSa and cancel each other out. Here, w1 is set at 1 so that the process is dealt with by control of the ICS alone; however, w1 may take on any value. In that case, the ICS acquires the transmission weight factor w1 from the BSb separately, and calculates the transmission weight factor w2 based on a calculation formula: w2=−w1*x1/x2. Alternatively, the transmission weight factor w1 of the ICS and the BSb may be set at a known fixed value.

(5) Thereafter, as in Embodiment 1, when a data signal which the BSb transmits to the MSb in the next transmission is assumed to be D, the BSb transfers the data signal D to the ICS via the communicating unit Z before actually transmitting the data signal D, and thereby shares the data signal D which the BSb transmits next and the transmission timing thereof with the ICS. The ICS generates an interference cancelling data signal D'(=D*w2) by multiplying the data signal D by the transmission weight factor w2 obtained in (4).

(6) The BSb transmits the data signal D to the MSb, and the ICS transmits the interference cancelling data signal D' in synchronization with timing with which the BSb transmits the data signal D to the MSb.

(7) Thereafter, during repetition of steps (1) to (6) or steps (5) and (6), the MSa and the BSa of the wireless communication system A perform communication and the MSb and the BSb of the wireless communication system B perform communication, but the wireless communication systems A and B are not required to be synchronized with each other. In terms of a received signal of the MSa during this period, the transmitted data signal D of the BSb, the signal which is an interference signal for the MSa, and the interference cancelling data signal D' transmitted from the ICS are in reversed phase at a reception point of the MSa and cancel each other out. That is, even when the wireless communication system A and the wireless communication system B use the same frequency channel, since the interference signal from the BSb of the wireless communication system B is cancelled out at the point of the MSa of the wireless communication system A, the MSa can perform communication with the BSa without being affected by the interference signal of the wireless communication system B. Although sometimes the interference cancelling data signal D' transmitted from the ICS also reaches the MSb of the wireless communication system B, the signal does not become a cancelling signal for the transmitted data signal D of the BSb in relation to the transmission weight factor w2.

A feature of Embodiment 2 is that calculation of the transmission weight factor and signal processing for interference cancelling are performed by the ICS and the MSa, and the BSa and the BSb do not have to perform special signal processing for interference cancelling.

Embodiment 3

Figure 7:
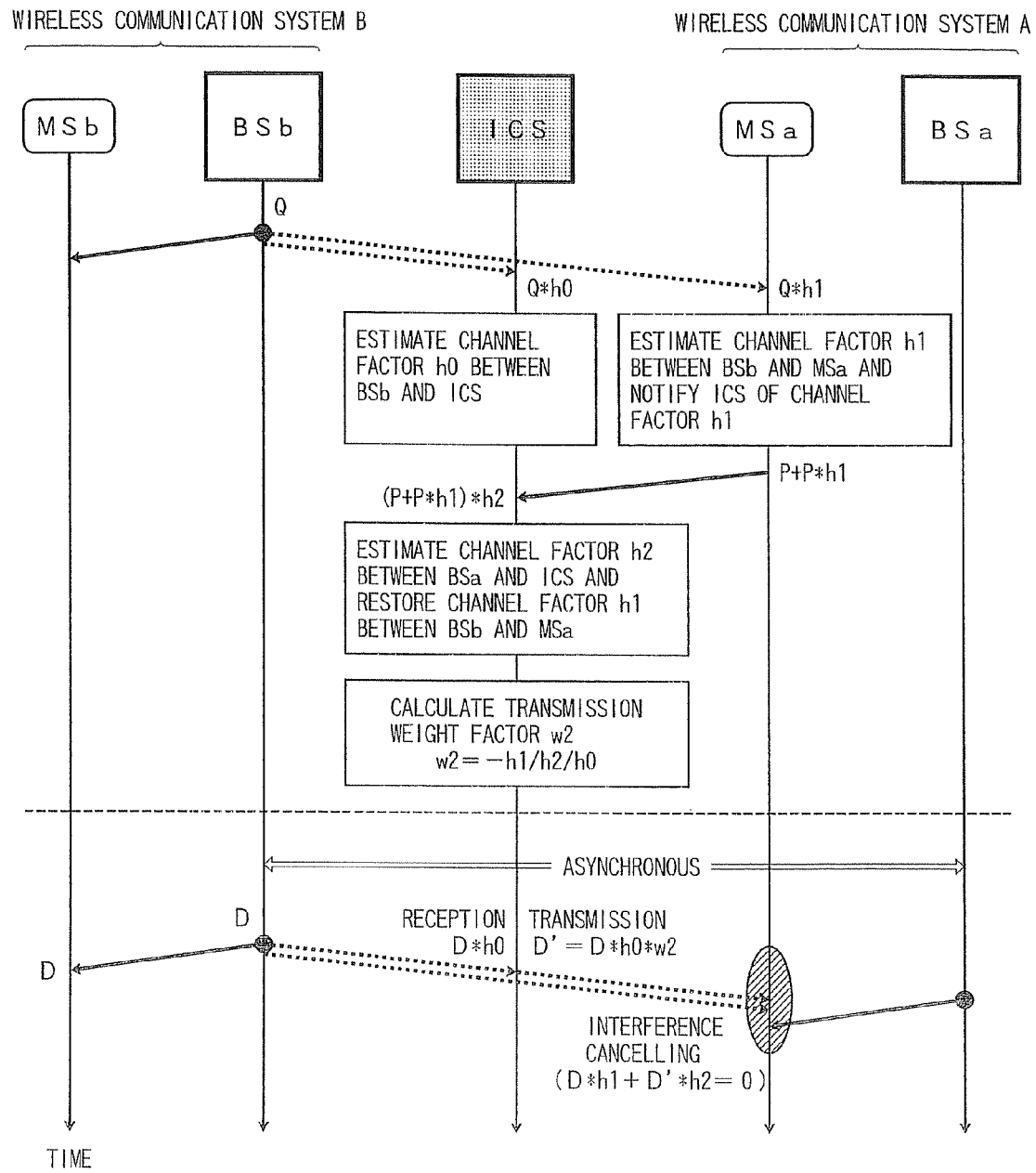
FIG. 7 is a diagram showing a process sequence of Embodiment 3.

FIG. 6 shows an example of a configuration of Embodiment 3 of the wireless communication system of the present invention. FIG. 7 shows a process sequence of Embodiment 3.

Unlike the configuration of Embodiment 1 shown in FIG. 1, the wireless communication system of Embodiment 3 shown in FIG. 6 is so configured that the BSb and the ICS are not connected via the communicating unit Z and the ICS is connected to the BSb and the MSa via a radio channel. A channel factor between the BSb and the ICS is assumed to be h0, a channel factor between the BSb and the MSa is assumed to be h1, and a channel factor between the MSa and the ICS is assumed to be h2. It is assumed that the wireless communication system A and the wireless communication system B use the same frequency channel in transmission and reception in a time division duplexing (TDD) method, and the channel factors h0, h1 and h2 have bidirectional reciprocity in communication. The same goes for the following embodiments.

Here, the ICS has a wireless interface for receiving and demodulating the radio waves of the BSb of the wireless communication system B and the MSa of the wireless communication system A. Moreover, the ICS has the function of multiplying an RF received signal by a transmission weight factor w2 by using RF sampling or the like and transmitting the signal immediately. It is assumed that the MSa can demodulate at least a known preamble signal added to the head, etc. of a frame of the signal of the wireless communication system B.

Hereinafter, a procedure of each wireless station in Embodiment 3 will be described with reference to FIGS. 6 and 7. FIG. 6(1) corresponds to a procedure performed until a transmission weight factor w2 is calculated in the ICS in following steps (1) to (4), and FIG. 6(2) corresponds to a procedure performed until a transmitted signal of the BSb is cancelled out at a reception point of the MSa in the following steps (5) and (6).

(1) When the data signal which the BSb transmitted to the MSb is received, the channel factor h0 between the BSb and the ICS and the channel factor h1 between the BSb and the MSa are estimated as follows by using a preamble signal Q at the head of a frame. The ICS treats the preamble signal Q in the wireless communication system B as a known signal and demodulates the received signal into the preamble signal Q. At this time, since the preamble signal Q obtained by demodulation is received as Q*h0 obtained by multiplying the preamble signal Q by the channel factor h0 between the BSb and the ICS, the channel factor h0 is estimated by dividing Q*h0 by the known preamble signal Q.

The MSa treats the preamble signal Q in the wireless communication system B as a known signal and demodulates the received signal into the preamble signal Q. At this time, since the preamble signal Q obtained by demodulation is received as Q*h1 obtained by multiplying the preamble signal Q by the channel factor h1 between the BSb and the MSa, the channel factor h1 is estimated by dividing Q*h1 by the known preamble signal Q. However, it is assumed that, for simplicity's sake, noise in the receivers can be ignored.

(2) As in Embodiment 2, as a data signal to be transmitted to the ICS, the MSa places a signal P*h1 obtained by multiplying a known preamble signal P by the channel factor h1 estimated in step (1) after the known preamble signal P at the head of a frame, and transmits the data signal to the ICS.

(3) The ICS receives the data signal transmitted by the MSa, and, as in Embodiment 2, first estimates the channel factor h2 between the MSa and the ICS by dividing a preamble signal P*h2 at the head of a frame by the known preamble signal P (P·h2/P=h2) and then restores the channel factor h1 between the BSb and the MSa by dividing the signal P*h1*h2 by the preamble signal P and the h2 obtained by the estimation (P*h1*h2/P/h2=h1).

(4) The ICS solves relational expression (5):

$$w1*h1+w2*w1*h0*h2=0 \quad (5)$$

for the channel factor h0 obtained in (1), the channel factors h1 and h2 obtained in step (3), and the transmission weight factors w1 and w2 of the BSb and the ICS, and thereby obtains the transmission weight factor w2 (=−h1/h2/h0) of the ICS. The transmission weight factors w1 and w2 are parameters set so that a transmitted signal D*w1 of the BSb and a transmitted signal (D*w1*h0)*w2 which is the signal obtained by the ICS by multiplying the received signal D*w1*h0 by the transmission weight factor w2 and transmitted thereby immediately are in reversed phase at a reception point of the MSa and cancel each other out. Here, although w1 can take on any value because the transmission weight factor w2 of the ICS is not affected by the transmission weight factor w1 of the BSb, w1 may be set at 1 so that the process is dealt with by control of the ICS alone.

(5) The BSb transmits a data signal D to the MSb. When the ICS receives a data signal D*h0 obtained by multiplying the data signal D by the channel factor h0 between the BSb and the ICS, the ICS generates an interference cancelling data signal D'(=D*h0*w2) by directly multiplying an RF received signal by the transmission weight factor w2 obtained in step (4) by using RF sampling or the like, and transmits the signal immediately. It is assumed that a time lag at that time is sufficiently short as compared with the symbol duration of the data signal D.

(6) Thereafter, during repetition of steps (1) to (5) or step (5), the MSa and the BSa of the wireless communication system A perform communication, but the wireless communication systems A and B are not required to be synchronized with each other. In terms of a received signal of the MSa during this period, the transmitted signal D of the BSb, the signal which is an interference signal for the MSa, and the interference cancelling data signal D' transmitted from the ICS are in reversed phase at a reception point of the MSa and cancel each other out. That is, even when the wireless communication system A and the wireless communication system B use the same frequency channel, since the interference signal from the BSb of the wireless communication system B is cancelled out at the point of the MSa of the wireless communication system A, the MSa can perform communication with the BSa without being affected by the interference signal of the wireless communication system B. Although sometimes the interference cancelling data signal D' transmitted from the ICS also reaches the MSb of the wireless communication system B, the signal does not become a cancelling signal for the transmitted data signal D of the BSb in relation to the transmission weight factor w2.

A feature of Embodiment 3 is that calculation of the transmission weight factor and signal processing for interference cancelling are performed by the ICS and the MSa, and the BSa and the BSb do not have to perform special signal processing for interference cancelling.

Embodiment 4

Figure 9:
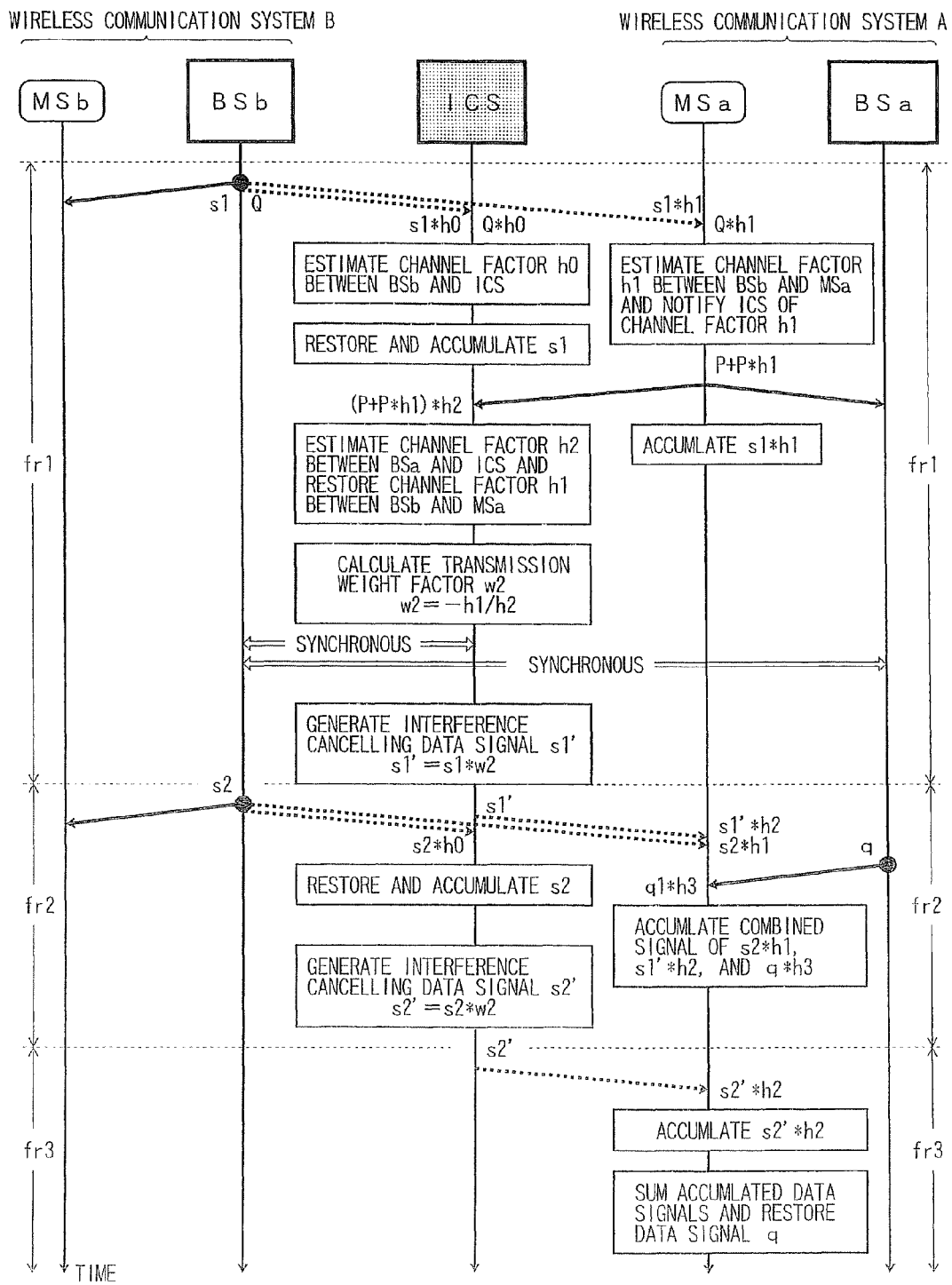
FIG. 9 is a diagram showing process sequence 1 of Embodiment 4.
Figure 10:
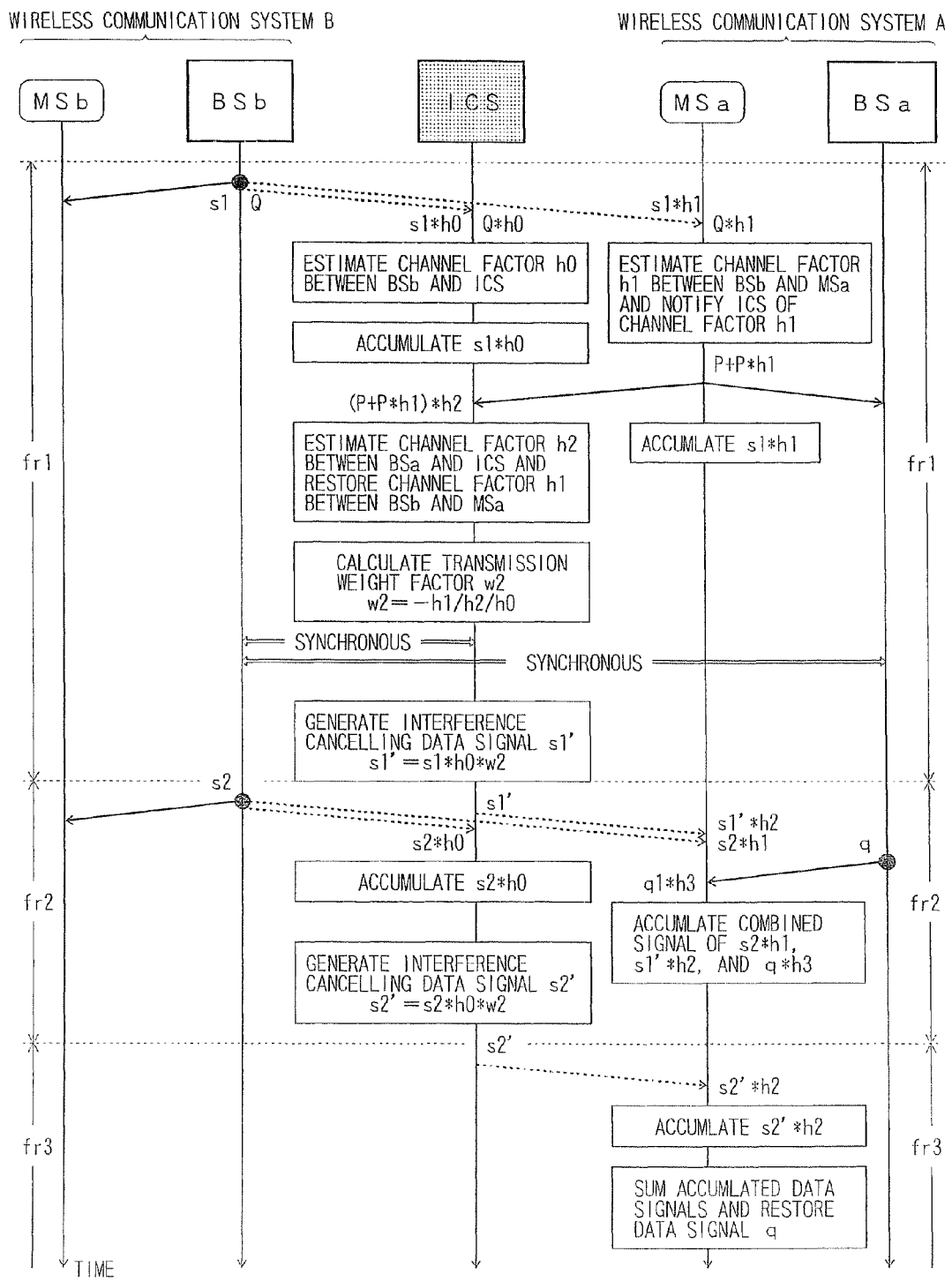
FIG. 10 is a diagram showing process sequence 2 of Embodiment 4.

FIG. 8 shows an example of a configuration of Embodiment 4 of the wireless communication system of the present invention. FIG. 9 shows process sequence 1 of Embodiment 4. FIG. 10 shows process sequence 2 of Embodiment 4.

The wireless communication system of this embodiment shown in FIG. 8 has the same configuration as that of Embodiment 3 shown in FIG. 6. A channel factor between the BSb and the ICS is assumed to be h0, a channel factor between the BSb and the MSa is assumed to be h1, a channel factor between the MSa and the ICS is assumed to be h2, and a channel factor between the MSa and the BSa is assumed to be h3.

Here, the ICS has a wireless interface for receiving and demodulating the radio waves of the BSb of the wireless communication system B and the MSa of the wireless communication system A and a buffer restoring the data signal transmitted by the BSb and accumulating the data signal of at least (N−L) frames (N is an integer which is 2 or more, and L is an integer which is 1 or more but (N−1) or less).

It is assumed that the MSa can demodulate at least a known preamble signal added to the head, etc. of frame of the signal of the wireless communication system B, and has a buffer accumulating received data of at least N frames on a frame-by-frame basis and an adder combining the received data accumulated on a frame-by-frame basis.

When the BSb periodically transmits a data signal s1 in frame fr1, a data signal s2 in frame fr2, . . . , a data signal s(N−L) in frame fr(N−L) within a time period of N frames, the ICS has the function of transmitting interference cancelling data signals s1'(=s1*w2), s2', . . . , s(N−L)', which are obtained by multiplying the transmitted data signals of the BSb by the transmission weight factor w2, after L frame delay in synchronization with the above frame period. At this time, the BSb stops the transmission of data signals between frame fr(N−L+1) and frame frN.

The BSa transmits a data signal q of one frame in any frame within a time period of N frames in synchronization with the above frame period, and the MSa has the function of accumulating combined signals of the data signals s1 to s(N−L) transmitted by the BSb on a frame-by-frame basis in synchronization with the frame period, the interference cancelling data signals s1' to s(N−L)' displaced therefrom by L frame, and the data signal q transmitted by the BSa on a frame-by-frame basis and combining the signals on a frame-by-frame basis.

Hereinafter, a procedure of each wireless station in Embodiment 4 will be described with reference to FIGS. 8 to 11. FIG. 8(1) corresponds to a procedure performed until a transmission weight factor w2 is calculated in the ICS in following steps (1) to (4), and FIG. 8(2) corresponds to a procedure performed until a transmitted signal of the BSb is cancelled out in the MSa in following steps (5) and (6).

(1) When the BSb transmits a data signal s1 to the MSb in frame fr1 and the ICS and the MSa receive the data signal s1, the ICS and the MSa estimate a channel factor h0 between the BSb and the ICS and a channel factor h1 between the BSb and the MSa by using a preamble signal Q at the head of a frame in the same manner as in Embodiment 3. That is, the ICS estimates the channel factor h0 by dividing the received preamble signal Q*h0 by the known preamble signal Q, and the MSa estimates the channel factor h1 by dividing the received preamble signal Q*h1 by the known preamble signal Q.

(2) The ICS restores the data signal s1 by dividing the received data signal s1*h0 by the channel factor h0 estimated in step (1), and accumulates the signal in the buffer as the data signal s1 in frame fr1.

(3) As in Embodiment 2, as a data signal to be transmitted to the ICS, the MSa places a signal P*h1 obtained by multiplying a known preamble signal P by the channel factor h1 estimated in step (1) after the known preamble signal P at the head of a frame, and transmits the data signal to the ICS. Moreover, the MSa accumulates the received data signal s1*h1 in the buffer as it is as the data signal in frame fr1.

(4) The ICS receives the data signal transmitted by the MSa, and, as in Embodiment 2, first estimates the channel factor h2 between the MSa and the ICS by dividing a preamble signal P*h2 at the head of a frame by the known preamble signal P (P*h2/P=h2) and then restores the channel factor h1 between the BSb and the MSa by dividing the signal P*h1*h2 by the preamble signal P and the h2 obtained by the estimation (P*h1*h2/P/h2=h1).

(5) The ICS solves the relational expressions (3) and (4) of Embodiment 2 for the channel factors h1 and h2 obtained in step (4) and the transmission weight factors w1 and w2 of the BSb and the ICS, and thereby obtains the transmission weight factor w2 (=−h1/h2) of the ICS. The transmission weight factors w1 and w2 are parameters set so that a transmitted signal D*w1 of the BSb and a transmitted signal D*w2 of the ICS are in reversed phase at a reception point of the MSa and cancel each other out. Here, w1 is set at 1 so that the process is dealt with by control of the ICS alone; however, the transmission weight factor w1 may be set at a known fixed value in the ICS and the BSb.

(6) When the BSb transmits the data signals s2, s3, . . . , sL to the MSb until frame frL and the ICS and the MSa receive the data signals, the ICS restores the data signals s2 to sL transmitted until frame frL and accumulates the signals in the buffer on a frame-by-frame basis in the same manner as in step (2), and the MSa accumulates the received data signals s2*h1 to sL*h1 received until frame frL in the buffer as they are on a frame-by-frame basis in the same manner as in step (3). FIGS. 8 to 11 show a case in which L=1 and there is no data signal accumulation processing.

(7) The BSb transmits a data signal s(L+1) to the MSb in frame fr(L+1). The ICS generates an interference cancelling data signal s1'(=s1*w2) by multiplying the data signal s1 accumulated in the buffer in step (2) by the transmission weight factor w2 obtained in step (5), and transmits the signal to the MSa in synchronization with timing of frame fr(L+1). Moreover, as in step (2), the ICS restores the data signal s(L+1) by dividing the received data signal s(L+1)*h0 by the channel factor h0 estimated in step (1), and accumulates the signal in the buffer as the data signal s(L+1) in frame fr(L+1).

Next, the BSb transmits a data signal s(L+2) to the MSb in frame fr(L+2). The ICS generates an interference cancelling data signal s2'(=s2*w2) in the same manner as described above, and transmits the signal to the MSa in synchronization with timing of frame fr(L+2). In addition, the ICS restores the data signal s(L+2) in the same manner as described above, and accumulates the signal in the buffer as the data signal s(L+2) in frame fr(L+2). Then, the ICS repeats the same processing until the frame reaches frame fr(N−L).

FIGS. 8 and 9 show a case in which L=1 and N=3, and the BSb only transmits the data signal s2 in frame fr2, and the ICS only transmits the interference cancelling data signal s1' (=s1*w2) synchronously and restores the data signal s2 or accumulates the received data signal s2*h0 as it is.

(8) The BSb does not transmit a data signal in frames fr(N−L+1) to frN, and the ICS generates interference cancelling data signals s(N−2L+1)' to s(N−L)' and transmits the signals to the MSa in synchronization with the frame timing. FIGS. 8 and 9 show a case in which L=1 and N=3, and, after frame fr3, the ICS only transmits the interference cancelling data signal s2'(=s2*w2).

Figure 11:
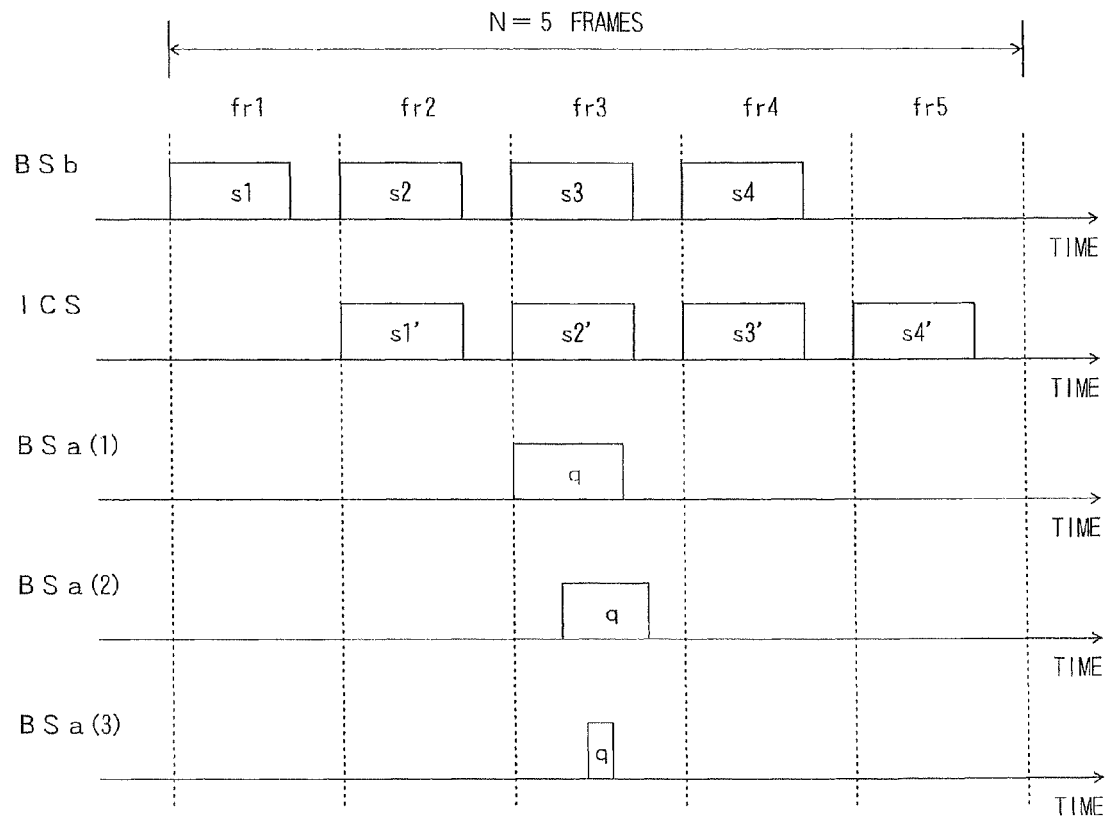
FIG. 11 is a diagram showing operation example 1 of Embodiment 4.

(9) The BSa transmits a data signal q to the MSa with timing of any one frame (which is assumed to be frame frx) in the frames fr1 to frN in steps (1) to (8). The condition of the transmitted frame of the BSa is, as shown in FIG. 11 as three patterns of BSa(1), (2), and (3), for example, starting and finishing transmission in one frame time of the BSb, and the head timing of the frame of the BSa and the head timing of the frame of the BSb do not necessarily have to be in synchronization with each other.

For that purpose, in addition to the configuration in which the wireless communication system A and the wireless communication system B are the same wireless communication system and operate synchronously in an adjacent cell relationship, a method by which the wireless communication system A and the wireless communication system B are in frame synchronization with each other in the background based on the absolute time information of a global positioning system (GPS), etc. may be adopted. Instead, a method by which the MSa of the wireless communication system A receives the data signal s1 in frame fr1, the data signal used for the estimation of the channel factor h1, the BSa receives a data signal transmitted by the MSa toward the ICS with the channel factor h1 obtained by the estimation on reversed link, and the BSa autonomously controls the frame timing of the N frames by detecting the timing of frame fr1 may be adopted. Alternatively, the MSa of the wireless communication system A may receive the data signal s1 in frame fr1, the data signal used for the estimation of the channel factor h1, and transfer the data signal to the BSa with the timing control information attached thereto as part of the data signal transmitted toward the ICS with the channel factor h1 obtained by the estimation on reversed link.

(10) The MSa accumulates the received signals in the buffer on a frame-by-frame basis in steps (3) to (9). The received data signals thus accumulated are as follows: frames fr1 to frL are only the received data signals s1*h1 to sL*h1 from the BSb, frames fr(L+1) to fr(N−L) are represented as the sum of the received data signals s(L+1)*h1 to fr(N−L)*h1 from the BSb and the interference cancelling data signals s1'*h2 to s(N−2L+1)'*h2 from the ICS, frames fr(N−L+1) to frN are only the interference cancelling data signals s(N−2L+2)'*h2 to s(N−L)'*h2 from the ICS, and, to an arbitrary frame frx of the frames, the received data signal q*h3 from the BSa is added. FIGS. 8 and 9 show a case in which N=3, L=1, and x=2, and FIG. 11 shows a case in which N=5, L=1, and x=3.

(11) The MSa sums the accumulated data in the buffer on a frame-by-frame basis, whereby the received data signals from the BSb and the interference cancelling data signals from the ICS, the interference cancelling data signals displaced therefrom by L frame, are sequentially cancelled out, and only the received data signal q*h3 from the BSa is extracted. The MSa estimates the channel factor h3 by dividing a preamble signal R*h3 of the received data signal q*h3 by a known preamble signal R, and restores the data signal q by dividing the received data signal q*h3 by the channel factor h3 obtained by the estimation.

As described above, since the interference signal from the BSb of the wireless communication system B is cancelled out by the internal processing performed by the MSa of the wireless communication system A even when the wireless communication system A and the wireless communication system B use the same frequency channel, the MSa can perform communication with the BSa without being affected by the interference signal of the wireless communication system B. Sometimes the interference cancelling data signal D' transmitted from the ICS also reaches the MSb of the wireless communication system B, the signal does not become a cancelling signal for the transmitted data signal D of the BSb in relation to the transmission weight factor w2.

A feature of this embodiment is that calculation of the transmission weight factor and signal processing for interference cancelling are performed by the ICS and the MSa, and the BSa and the BSb do not have to perform special signal processing for interference cancelling.

(Variation 1 of Embodiment 4)

The above-described steps (2), (5), (6), (7), and (8) may be modified as follows. A description will be given with reference to FIG. 10 which serves as an alternative to FIG. 9.

(2) The ICS accumulates the received data signal s1*h0 in the buffer as a data signal in frame fr1.

(5) The ICS solves the relational expression (5) of Embodiment 3 for the channel factor h0 obtained in step (1), the channel factors h1 and h2 obtained in step (4), and the transmission weight factors w1 and w2 of the BSb and the ICS, and thereby obtains the transmission weight factor w2 (=−h1/h2/h0) of the ICS. The transmission weight factors w1 and w2 are parameters set so that a transmitted signal D*w1 of the BSb and a transmitted signal D*w2 of the ICS are in reversed phase at a reception point of the MSa and cancel each other out. Here, although w1 can take on any value because the transmission weight factor w2 of the ICS is not affected by the transmission weight factor w1 of the BSb, w1 may be set at 1 so that the process is dealt with by control of the ICS alone.

(6) When the BSb transmits the data signals s2, s3, the subsequent data signal, and sL to the MSb until frame frL and the ICS and the MSa receive the data signals, the ICS accumulates the data signals s2*h0 to sL*h0 received until frame frL in the buffer as they are on a frame-by-frame basis in the same manner as in step (2), and the MSa accumulates the received data signals s2*h1 to sL*h1 received until frame frL in the buffer as they are on a frame-by-frame basis in the same manner as in step (3). FIG. 10 shows a case in which L=1 and there is no data signal accumulation processing.

(7) The BSb transmits a data signal s(L+1) to the MSb in frame fr(L+1). The ICS generates an interference cancelling data signal s1'(=s1*h0*w2) by multiplying the data signal s1*h0 accumulated in the buffer in step (2) by the transmission weight factor w2 obtained in step (5), and transmits the signal to the MSa in synchronization with timing of frame fr(L+1). Moreover, the ICS accumulates the received data signal s(L+1)*h0 in the buffer as a data signal in frame fr(L+1) in the same manner as in step (2).

Next, the BSb transmits a data signal s(L+2) to the MSb in frame fr(L+2). The ICS generates an interference cancelling data signal s2'(=s2*h0*w2) in the same manner as described above, and transmits the signal to the MSa in synchronization with timing of frame fr(L+2). Moreover, the ICS accumulates the data signal s(L+2)*h0 in the buffer as a data signal in frame fr(L+2) in the same manner as described above. Then, the ICS repeats the same processing until the frame reaches frame fr(N−L).

FIG. 10 shows a case in which L=1 and N=3, and the BSb only transmits the data signal s2 in frame fr2, and the ICS only transmits the interference cancelling data signal s1' (=s1*h0*w2) synchronously and accumulates the received data signal s2*h0 as it is.

(8) The BSb does not transmit a data signal in frames fr(N−L+1) to frN, and the ICS generates interference cancelling data signals s(N−2L+1)' to s(N−L)' and transmits the signals to the MSa in synchronization with the frame timing. FIG. 10 shows a case in which L=1 and N=3, and, after frame fr3, the ICS only transmits the interference cancelling data signal s2' (=s2*h0*w2).

(Variation 2 of Embodiment 4)

In Embodiment 4 described above, as shown in FIG. 11, a frame in which the BSa can perform transmission is one frame of N frames in which the BSb performs transmission. This is because, if the BSa transmits different data signals in a plurality of frames of N frames, these data signals cannot be separated by addition processing performed for interference cancelling.

Figure 12:
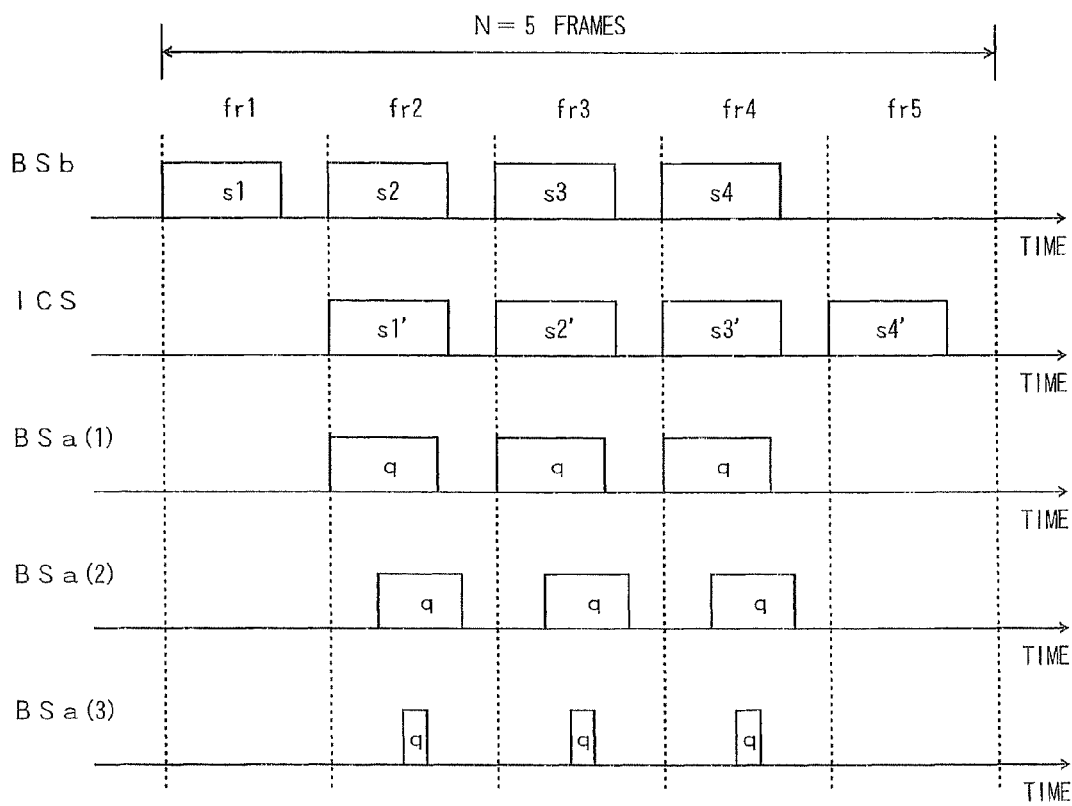
FIG. 12 is a diagram showing operation example 2 of Embodiment 4.

On the other hand, as shown in FIG. 12, when the BSa repeatedly transmits the same data signal in a plurality of frames of N frames, the received data signals q*h3 from the BSa are added by the iteration number and extracted in step (11) described above. FIG. 12 is an example in which the BSa transmits a data signal q in frames fr2, fr3, and fr4 of frames fr1 to fr5, and 3*q*h3 is extracted as a received data signal. The MSa estimates a channel factor h3 as shown in step (11), and a signal 3*q obtained by in-phase combining performed on the data signals q transmitted by the BSa is obtained by dividing the received data signal 3*q*h3 by the channel factor h3 obtained by the estimation. As described above, it is possible to obtain a combined gain as a result of the BSa performing transmission repeatedly.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication system comprising a wireless communication system A and a wireless communication system B which use a same frequency channel in mutually adjacent or overlapping wireless areas and an interference cancelling station ICS installed in a location different from locations of base stations and mobile stations of the wireless communication systems A and B, wherein the interference cancelling station ICS comprises:

a transmission weight factor calculating unit calculating a transmission weight factor w2 of the interference cancelling station ICS by using a first information corresponding to a propagation path between a mobile station MSa of the wireless communication system A and a base station BSb of the wireless communication system B and a second information corresponding to a propagation path between the mobile station MSa of the wireless communication system A and the interference cancelling station ICS; and an interference cancelling data signal transmitting unit generating an interference cancelling data signal by multiplying, by the transmission weight factor w2, a data signal which the base station BSb of the wireless communication system B transmits to a subordinate mobile station, and transmitting the interference cancelling data signal in synchronization with timing with which the base station BSb of the wireless communication system B transmits the data signal, in which the interference cancelling data signal (D') and the data signal (D) of the base station BSb are in reverse phase at a reception point of the mobile station MSa, such that the mobile station MSa of the wireless communication system A receives a data signal transmitted by a base station BSa of the wireless communication system A having cancelled interference.

2. The wireless communication system according to claim 1, wherein when the first information is a radio signal x1 transmitted by the mobile station MSa of the wireless communication system A and received by the base station BSb of the wireless communication system B, the second information is a radio signal x2 transmitted by the mobile station MSa of the wireless communication system A and received by the interference cancelling station ICS, and a transmission weight factor of the base station BSb of the wireless communication system B is w1, the base station BSb of the wireless communication system B comprises a unit transmitting, before transmitting a data signal to the subordinate mobile station, the radio signal x1 and the data signal to the interference cancelling station ICS via a dedicated communication line, and the transmission weight factor calculating unit of the interference cancelling station ICS calculates the transmission weight factor w2 (=−w1*x1/x2) from a relational expression $$w1*x1+w2*x2=0$$

for the radio signals x1 and x2 and the transmission weight factors w1 and w2.

3. The wireless communication system according to claim 1, wherein when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS, and a transmission weight factor of the base station BSb of the wireless communication system B is w1, the base station BSb of the wireless communication system B comprises a unit transmitting, before transmitting a data signal to the subordinate mobile station, the data signal to the interference cancelling station ICS via a dedicated communication line, and the transmission weight factor calculating unit of the interference cancelling station ICS calculates the transmission weight factor w2 (=−w1*h1/h2) from a relational expression $$w1*h1+w2*h2=0$$

for the channel factors h1 and h2 and the transmission weight factors w1 and w2.

4. The wireless communication system according to claim 1, wherein when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit of the interference cancelling station ICS calculates the transmission weight factor w2 (=−h1/h2/h0) from a relational expression $$w1*h1+w2*w1*h0*h2=0$$

for the channel factors h0, h1, and h2 and the transmission weight factors w1 and w2, and the interference cancelling data signal transmitting unit of the interference cancelling station ICS receives, on an RF device, a data signal which the base station BSb of the wireless communication system B transmits to the subordinate mobile station, and, at a same time, multiplies the data signal by the transmission weight factor w2 and transmits a resulting signal as the interference cancelling data signal.

5. The wireless communication system according to claim 1, wherein when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit of the interference cancelling station ICS calculates the transmission weight factor w2 (=−w1*h1/h2) from a relational expression $$w1*h1+w2*h2=0$$

for the channel factors h1 and h2 and the transmission weight factors w1 and w2, the base station BSb of the wireless communication system B sequentially transmits data signals to the subordinate mobile station from a frame 1 to a frame (N−L), L being an integer which is 1 or more but (N−1) or less, within a time period of N frames, N being an integer which is 2 or more, and stops data transmission from a frame (N−L+1) to a frame N, the base station BSa of the wireless communication system A transmits a data signal in one frame within the time period of the N frames, when the interference cancelling data signal transmitting unit of the interference cancelling station ICS receives the data signals in the frame 1 to the frame (N−L), the data signals being transmitted by the base station BSb of the wireless communication system B, the interference cancelling data signal transmitting unit divides the data signals by the channel factor h0 and further multiplies the data signals by the transmission weight factor w2 so as to generates interference cancelling data signals, and sequentially transmits the interference cancelling data signals with timing of a frame (L+1) to the frame N, and the mobile station MSa of the wireless communication system A adds the data signals received from the base station BSb of the wireless communication system B within the time period of the N frames, the interference cancelling data signals received from the interference cancelling station ICS, and the data signal received from the base station BSa of the wireless communication system A on a frame-by-frame basis, cancels out interference from the base station BSb of the wireless communication system B, and extracts the data signal received from the base station BSa.

6. The wireless communication system according to claim 1, wherein when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit of the interference cancelling station ICS calculates the transmission weight factor w2 (=−h1/h2/h0) from a relational expression $$w1*h1+w2*w1*h0*h2=0$$

for the channel factors h0, h1, and h2 and the transmission weight factors w1 and w2, the base station BSb of the wireless communication system B sequentially transmits data signals to the subordinate mobile station from a frame 1 to a frame (N−L), L being an integer which is 1 or more but (N−1) or less, within a time period of N frames, N being an integer which is 2 or more, and stops data transmission from a frame (N−L+1) to a frame N, the base station BSa of the wireless communication system A transmits a data signal in one frame within the time period of the N frames, when the interference cancelling data signal transmitting unit of the interference cancelling station ICS receives the data signals in the frame 1 to the frame (N−L), the data signals being transmitted by the base station BSb of the wireless communication system B, the interference cancelling data signal transmitting unit generates interference cancelling data signals by multiplying the data signals by the transmission weight factor w2 and sequentially transmits the interference cancelling data signals with timing of a frame (L+1) to the frame N, and the mobile station MSa of the wireless communication system A adds the data signals received from the base station BSb of the wireless communication system B within the time period of the N frames, the interference cancelling data signals received from the interference cancelling station ICS, and the data signal received from the base station BSa of the wireless communication system A on a frame-by-frame basis, cancels out interference from the base station BSb of the wireless communication system B, and extracts the data signal received from the base station BSa.

7. The wireless communication system according to claim 5 or 6, wherein the base station BSa of the wireless communication system A transmits a same data signal in a plurality of frames within the time period of the N frames, and the mobile station MSa of the wireless communication system A performs in-phase combining on received signals within the time period of the N frames and extracts the data signal received from the base station BSa.

8. The wireless communication system according to any one of claims 3 to 6, wherein the mobile station MSa of the wireless communication system A receives a data signal which the base station BSb of the wireless communication system B transmits to the subordinate mobile station, estimates the channel factor h1 by using a known preamble signal Q of the wireless communication system B, and transmits to the interference cancelling station ICS a signal obtained by multiplying a known preamble signal P of the wireless communication system A by the channel factor h1 being estimated after the known preamble signal P, and the interference cancelling station ICS receives a transmitted signal of the mobile station MSa of the wireless communication system A, estimates the channel factor h2 by using the known preamble signal P, and restores the channel factor h1 by using the channel factor h2 being estimated and the known preamble signal P.

9. The wireless communication system according to any one of claims 4 to 6, wherein the interference cancelling station ICS receives a data signal which the base station BSb of the wireless communication system B transmits to the subordinate mobile station, and estimates the channel factor h0 by using a known preamble signal Q of the wireless communication system B.

10. The wireless communication system according to any one of claims 2, 3, and 5, wherein the transmission weight factor calculating unit calculates the transmission weight factor w2 by setting w1 at 1.

11. An interference cancelling station of a wireless communication system having a wireless communication system A and a wireless communication system B which use a same frequency channel in mutually adjacent or overlapping wireless areas and an interference cancelling station ICS installed in a location different from locations of base stations and mobile stations of the wireless communication systems A and B, the interference cancelling station comprising:

a transmission weight factor calculating unit calculating a transmission weight factor w2 of the interference cancelling station ICS by using a first information corresponding to a propagation path between a mobile station MSa of the wireless communication system A and a base station BSb of the wireless communication system B and a second information corresponding to a propagation path between the mobile station MSa of the wireless communication system A and the interference cancelling station ICS; and an interference cancelling data signal transmitting unit generating an interference cancelling data signal by multiplying, by the transmission weight factor w2, a data signal which the base station BSb of the wireless communication system B transmits to a subordinate mobile station, and transmitting the interference cancelling data signal in synchronization with timing with which the base station BSb of the wireless communication system B transmits the data signal, wherein the interference cancelling data signal (D') and the data signal (D) of the base station BSb are in reverse phase at a reception point of the mobile station MSa, such that the interference cancelling station makes the mobile station MSa of the wireless communication system A cancel out interference from the base station BSb of the wireless communication system B and receive a data signal transmitted by a base station BSa of the wireless communication system A.

12. The interference cancelling station according to claim 11, wherein when the first information is a radio signal x1 transmitted by the mobile station MSa of the wireless communication system A and received by the base station BSb of the wireless communication system B, the second information is a radio signal x2 transmitted by the mobile station MSa of the wireless communication system A and received by the interference cancelling station ICS, and a transmission weight factor of the base station BSb of the wireless communication system B is w1, the transmission weight factor calculating unit calculates the transmission weight factor w2 ($=-w1*x1/x2$) from a relational expression $$w1*x1+w2*x2=0$$

for the radio signals x1 and x2 and the transmission weight factors w1 and w2.

13. The interference cancelling station according to claim 11, wherein when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS, and a transmission weight factor of the base station BSb of the wireless communication system B is w1, the transmission weight factor calculating unit calculates the transmission weight factor w2 ($=-w1*h1/h2$) from a relational expression $$w1*h1+w2*h2=0$$

for the channel factors h1 and h2 and the transmission weight factors w1 and w2.

14. The interference cancelling station according to claim 11, wherein when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit calculates the transmission weight factor w2 (=−h1/h2/h0) from a relational expression $$w1*h1+w2*w1*h0*h2=0$$

for the channel factors h0, h1, and h2 and the transmission weight factors w1 and w2, and the interference cancelling data signal transmitting unit receives, on an RF device, a data signal which the base station BSb of the wireless communication system B transmits to the subordinate mobile station, and, at a same time, multiplies the data signal by the transmission weight factor w2 and transmits a resultant signal as the interference cancelling data signal.

15. The interference cancelling station according to claim 11, wherein when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit calculates the transmission weight factor w2 (=−w1*h1/h2) from a relational expression $$w1*h1+w2*h2=0$$

for the channel factors h1 and h2 and the transmission weight factors w1 and w2, and when the base station BSb of the wireless communication system B sequentially transmits data signals to the subordinate mobile station from a frame 1 to a frame (N−L), L being an integer which is 1 or more but (N−1) or less, within a time period of N frames, N being an integer which is 2 or more, and stops data transmission from a frame (N−L+1) to a frame N, upon receipt of the data signals in the frame 1 to the frame (N−L), the data signals being transmitted by the base station BSb of the wireless communication system B, the interference cancelling data signal transmitting unit divides the data signals by the channel factor h0 and further multiplies the data signals by the transmission weight factor w2 so as to generates interference cancelling data signals, and sequentially transmits the interference cancelling data signals with timing of a frame (L+1) to the frame N.

16. The interference cancelling station according to claim 11, wherein when the first information is a channel factor h1 between the mobile station MSa of the wireless communication system A and the base station BSb of the wireless communication system B, the second information is a channel factor h2 between the mobile station MSa of the wireless communication system A and the interference cancelling station ICS and a channel factor h0 between the base station BSb of the wireless communication system B and the interference cancelling station ICS, and a transmission weight factor of the base station BSb of the wireless communication system B is w1, the transmission weight factor calculating unit calculates the transmission weight factor w2 (=−h1/h2/h0) from a relational expression $$w1*h1+w2*w1*h0*h2=0$$

for the channel factors h0, h1, and h2 and the transmission weight factors w1 and w2, and when the base station BSb of the wireless communication system B sequentially transmits data signals to the subordinate mobile station from a frame 1 to a frame (N−L), L being an integer which is 1 or more but (N−1) or less, within a time period of N frames, N being an integer which is 2 or more, and stops data transmission from a frame (N−L+1) to a frame N, upon receipt of the data signals in the frame 1 to the frame (N−L), the data signals being transmitted by the base station BSb of the wireless communication system B, the interference cancelling data signal transmitting unit generates interference cancelling data signals by multiplying the data signals by the transmission weight factor w2, and sequentially transmits the interference cancelling data signals with timing of a frame (L+1) to the frame N.

17. The interference cancelling station according to any one of claims 12, 13, and 15, wherein the transmission weight factor calculating unit calculates the transmission weight factor w2 by setting w1 at 1.

18. An interference cancelling method of a wireless communication system comprising a wireless communication system A and a wireless communication system B which use a same frequency channel in mutually adjacent or overlapping wireless areas and an interference cancelling station ICS installed in a location different from locations of base stations and mobile stations of the wireless communication systems A and B, wherein the interference cancelling station ICS:

calculates a transmission weight factor w2 of the interference cancelling station ICS by using a first information corresponding to a propagation path between a mobile station MSa of the wireless communication system A and a base station BSb of the wireless communication system B and a second information corresponding to a propagation path between the mobile station MSa of the wireless communication system A and the interference cancelling station ICS; and generates an interference cancelling data signal by multiplying, by the transmission weight factor w2, a data signal which the base station BSb of the wireless communication system B transmits to a subordinate mobile station, and transmits the interference cancelling data signal in synchronization with timing with which the base station BSb of the wireless communication system B transmits the data signal, in which the interference cancelling data signal (D') and the data signal (D) of the base station BSb are in reverse phase at a reception point of the mobile station MSa, such that the interference cancelling station makes the mobile station MSa of the wireless communication system A cancel out interference from the base station BSb of the wireless communication system B, and receive a data signal transmitted by a base station BSa of the wireless communication system A.

* * * * *